United States Patent
Raslambekov et al.

(10) Patent No.: US 10,717,208 B1
(45) Date of Patent: Jul. 21, 2020

(54) METHODS AND SYSTEMS FOR THERMOFORMING ORTHODONTIC ALIGNERS

(71) Applicant: Oxilio Ltd, Larnaca (CY)

(72) Inventors: Islam Khasanovich Raslambekov, Long Island City, NY (US); Khamzat Saidovich Asabaev, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 16/703,453

(22) Filed: Dec. 4, 2019

(51) Int. Cl.
 *A61C 7/08* (2006.01)
 *A61C 7/00* (2006.01)
 (Continued)

(52) U.S. Cl.
 CPC .......... *B29C 33/3842* (2013.01); *A61C 7/002* (2013.01); *A61C 7/08* (2013.01);
 (Continued)

(58) Field of Classification Search
 CPC ....... A61C 7/08; A61C 13/0004; A61C 7/002; A61C 7/00; A61C 9/004; G05B 19/4097;
 (Continued)

(56) References Cited

U.S. PATENT DOCUMENTS 6,454,565 B2 9/2002 Phan et al.
7,831,322 B2 11/2010 Liu et al.
(Continued)

FOREIGN PATENT DOCUMENTS

KR 20150097338 A 8/2015
WO 2017198514 A1 11/2017
(Continued)

OTHER PUBLICATIONS

Neri et al., "Design and manufacturing of patent-specific orthodontic appliances by computer-aided engineering techniques", Proc Inst Mech Eng H. Jan. 2018;232(1):54-66. doi: 10.1177/0954411917742945. Epub Nov. 21, 2017., retrieved on Jan. 8, 2020 from https://www.researchgate.net/publication/321192892_Design_and_manufacturing_of_patient-specific_orthodontic_appliances_by_computeraided_engineering_techniques.

*Primary Examiner* — Michael J Brown
(74) *Attorney, Agent, or Firm* — BCF LLP

(57) ABSTRACT

A method for determining a manufacturing parameter for making an aligner with a desired aligner thickness using a thermoforming device operable for making the aligner by shaping a precursor aligner into the aligner using a mold representative of a dental archform, the method implemented by a computer system connectable to the thermoforming device, the method comprising: obtaining a 3D map associated with the dental archform; parsing the 3D map to determine a first property value and a second property value, the first property value being based on the 3D map and the second property value being derived from a 2D projection of the 3D map, and determining a thickness of the precursor aligner for obtaining the desired aligner thickness based on a ratio of the first property value and the second property value and a given value of an operating parameter of the thermoforming device.

18 Claims, 14 Drawing Sheets

(51) Int. Cl.
*A61C 9/00* (2006.01)
*B29C 51/30* (2006.01)
*B29C 33/38* (2006.01)
*B29C 64/386* (2017.01)
*B33Y 10/00* (2015.01)
*B33Y 30/00* (2015.01)
*B33Y 50/00* (2015.01)
*B33Y 80/00* (2015.01)
*G05B 19/40* (2006.01)
*B29L 31/00* (2006.01)

(52) U.S. Cl.
CPC .............. *A61C 9/004* (2013.01); *B29C 51/30* (2013.01); *B29C 64/386* (2017.08); *B33Y 10/00* (2014.12); *B33Y 30/00* (2014.12); *B33Y 50/00* (2014.12); *B33Y 80/00* (2014.12); *B29L 2031/753* (2013.01); *B29L 2031/757* (2013.01)

(58) Field of Classification Search
CPC .......... G05B 2219/35012; G05B 2219/45167; B29C 33/3842; B29C 64/386; B29C 51/30; B33Y 10/00; B33Y 30/00; B33Y 50/00; B33Y 80/00; B29L 2031/753; B29L 2031/757

USPC ........................................................ 700/197
See application file for complete search history.

(56) References Cited

U.S. PATENT DOCUMENTS

| | | | |
|---|---|---|---|
| 8,765,031 | B2 | 7/2014 | Li et al. |
| 8,905,756 | B2 | 12/2014 | Schwartz et al. |
| 9,381,071 | B2 | 7/2016 | Anderson et al. |
| 10,011,050 | B2 | 7/2018 | Kitching et al. |
| 10,052,176 | B2 | 8/2018 | Li et al. |
| 10,130,445 | B2 | 11/2018 | Kopelman et al. |
| 10,426,575 | B1 | 10/2019 | Raslambekov |
| 2007/0122592 | A1 | 5/2007 | Anderson et al. |
| 2015/0013688 | A1 | 1/2015 | Frantz et al. |
| 2017/0007359 | A1 | 1/2017 | Kopelman et al. |
| 2017/0100209 | A1* | 4/2017 | Wen ................. A61C 7/002 |
| 2018/0289448 | A1 | 10/2018 | Goodman et al. |
| 2019/0046293 | A1 | 2/2019 | A P A Bindu et al. |

FOREIGN PATENT DOCUMENTS

| | | |
|---|---|---|
| WO | 2018138650 A1 | 8/2018 |
| WO | 2019009992 A1 | 1/2019 |

* cited by examiner

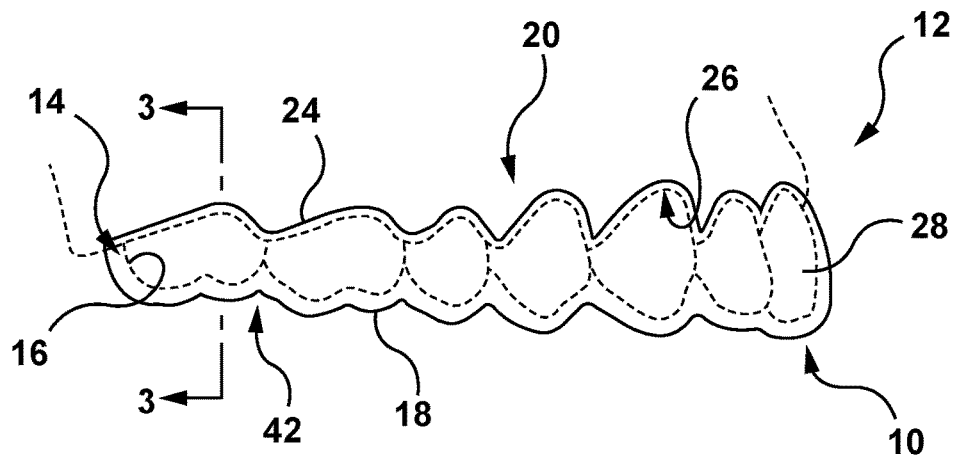
FIG. 1
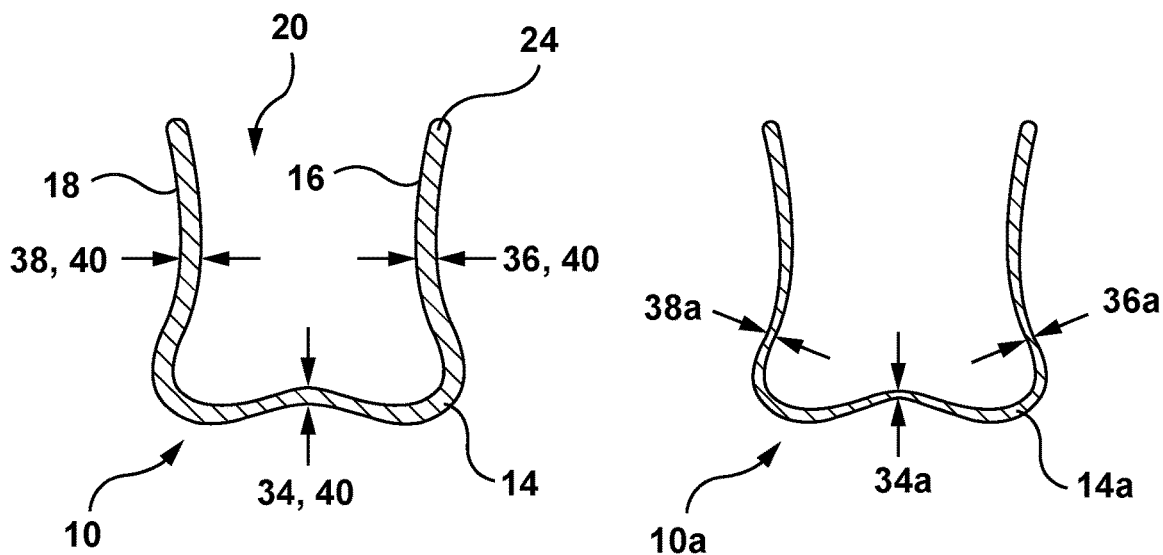
FIG. 2
FIG. 3 (PRIOR ART)

Defining a plane 216 for projecting the 3D map 94, the parsing the 3D map 94 comprising projecting the 3D map 94 on the plane 216 for generating the 2D projection 214

Predetermining the ratio 222 of the first map property value and the second map property value before the obtaining the 3D map 94

METHODS AND SYSTEMS FOR THERMOFORMING ORTHODONTIC ALIGNERS

FIELD

The present technology relates to methods and systems for thermoforming orthodontic aligners.

BACKGROUND

In orthodontics, treatments for achieving alignment of malposed teeth in a subject include applying orthodontic appliances, such as orthodontic aligners, to the subject's teeth. Orthodontic aligners are typically worn over the teeth of the top and/or bottom archforms in order to exert loads to the teeth to induce tooth movements or to retain tooth positions. Although they are removable, aligners are typically arranged to be worn for extended periods during the day and/or night.

Aligners are typically custom-designed, in terms of shape and thickness, to the subject's teeth and an orthodontic treatment for exerting desired loading conditions to the teeth. In order to attain a desired correction, a sequence of consecutive treatment stages using a sequence of aligners, respectively configured to exert certain loads, may be needed. Generally, the shapes of the aligners and their thickness, among other factors, determine the effective loading conditions that may be exerted to the teeth and the effective correction that may be attained.

One method of manufacturing such orthodontic aligners comprises thermoforming using thermoforming devices. In conventional thermoforming methods, precursor aligners (also referred to as "blanks" or "workpieces") are shaped over a mold representative of the desired aligner configuration facilitated by heat and pressure. However, in certain circumstances, these methods give rise to inconsistent results in which the configuration of the aligner thus produced differs from the desired aligner configuration. Such variations can give rise to ineffective orthodontic treatments or discomfort to the subject.

It is an object of the present technology to ameliorate at least some of the inconveniences present in the prior art.

SUMMARY

Embodiments of the present technology have been developed based on developers' appreciation of certain shortcomings associated with conventional methods and systems used for making orthodontic aligners.

Embodiments of the present technology have been developed based on the developers' observation that conventional thermoforming methods produce aligners with variable and unpredictable thicknesses. Deviation of the produced aligner thickness from the desired aligner thickness is undesirable as it can result in inefficient or ineffective orthodontic treatments. When such deviations are observed, the manufacturing process will need to be repeated until the desired configuration of aligner is obtained. Such repetition is undesirable in terms of the time and cost to make the desired aligners.

Developers have also noted that certain thermoforming operating parameters may affect the resultant aligner thickness, such as a thermoforming pressure, a thermoforming temperature, and a precursor aligner thickness. Precursor aligners are provided with a variety of thicknesses, and materials, the choice of which may affect the obtained aligner configuration. In attempting to attain a desired aligner thickness, the thermoforming operating parameters of operating pressure, operating temperature, and precursor aligner thickness must be varied experimentally, resulting in one or more failed attempts before an adequate combination is found. Understandably, the unpredictable nature of the experimental process has an adverse effect on productivity when applied to an industrial scale.

This is further confounded by the complexity of a shape of the archform of a subject, as well as the variation of archform shape between subjects. Indeed, even between subjects having a same given arch type (e.g., square-type, V-type, U-type) and a similar size (i.e., similar anteroposterior and mediolateral dimensions), the shape of their respective outer archform surface may vary in terms of their respective teeth's shapes and/or relations relative to their respective arch. Characterizing features of a given arch, for example the degree of eruption of its teeth, the depth of its sulci, and the lateral (i.e., away from their respective coronoapical axes) bulging of its teeth may define more and/or deeper concavities relative to a counterpart arch of another subject, and amount to having a lesser outer surface area, are among the factors amounting to the former's greater surface area. Further, characterizing features of a given tooth of the given arch, whether morphological or indicative of deterioration, distinguishes its topography. Indeed, a well-preserved tooth with no interproximal contact with any adjacent tooth (e.g., a distally-drifted second molar) will have a greater outer surface area relative to a counterpart tooth of another subject featuring worn down cusps or incisal edges, and/or being in contact with any respective adjacent tooth.

Developers of the present technology have observed that the above-mentioned variability in the outer surfaces areas has rendered practically impossible, according to conventional methods, the selection of the precursor aligner having a thickness that is adequate so as to be deformed into an aligner having a desired thickness (i.e., a thickness being within a predetermined range of desirable thicknesses). In most cases, iterating with several precursor aligner thicknesses, resulting in aligners being unfit for intended clinical use, is needed until an aligner having the desired thickness is obtained. Understandably, such unpredictability is undesirable in an industrial production context.

Conventionally, aligners may be designed according to computer software-based treatment simulations. Such simulations typically map out the changes desired in the positions and orientations of teeth in a staged manner between those of an initial teeth configuration and those of a desired, final teeth configuration. From the initial teeth configuration, a sequence of transitional teeth configurations is determined to discretize the overall desired displacement of the teeth. For each teeth configuration, a 3D map indicative of the outer surface of the teeth may be obtained.

In methods for determining an orthodontic treatment, such as an optimized sequence of treatment stages, such as the methods described in U.S. Ser. No. 16/132,995 filed on Sep. 17, 2018, the contents of which are herein incorporated by reference, the optimized sequence is determined as a function of certain parameters including standard aligner properties and physiological characteristics of the movements involved in bringing the teeth into the final configuration. In the optimized sequence, a given number of treatment stages are provided, including optimized loading conditions, optimized teeth configurations and optimized stage durations. The optimized loading conditions include the position, orientation and magnitude of the forces that must be applied to the teeth in order for them to be moved from one configuration to the next, and for adjacent anatomical structures to adapt accordingly.

In any stage of the optimized sequence, the corresponding optimized loading conditions must be commensurate to a corresponding aligner's load-bearing capacity. Indeed, the method determines the optimized sequence based on factors such as the precursor aligner material's intrinsic properties and a typical desired aligner thickness, for example 0.75 mm. As such, for a given stage, the method is used to determine a given 3D map of a corresponding given transitional teeth configuration, to be used as basis for generating a mold for shaping a given aligner. In theory, applying the given aligner for the given optimized duration to a subject's teeth being in the preceding teeth configuration, would cause the teeth to move into the given transitional teeth configuration.

However, in practice, the Developers have found that due to a thickness of the manufactured aligners differing from the desired thickness, thermoformed aligners of the prior art impart loading conditions that differ from their intended loading conditions, therefore skewing the teeth configuration that may be attained by applying such prior art aligners on a subject's teeth.

Hence, according to broad aspects and embodiments of the present technology, there are provided methods and systems of making orthodontic aligners which at least partially alleviate or solve the abovementioned problems.

According to one aspect, there is provided a method for determining a manufacturing parameter for making a desired aligner with a desired aligner thickness using a thermoforming device, the thermoforming device being operable for making the desired aligner by shaping a precursor aligner into the desired aligner using a given mold representative of a given dental archform, the method being implemented by a processor of a computer system connectable to the thermoforming device, the method comprising: obtaining a 3D map associated with the given dental archform; parsing the 3D map to determine a first map property value and a second map property value, the first map property value being based on the 3D map and the second map property value being derived from a 2D projection of the 3D map, and determining a thickness of the precursor aligner for obtaining the desired aligner thickness based on a ratio of the first map property value and the second map property value and a given value of an operating parameter of the thermoforming device.

In some embodiments, the 3D map is representative of the given mold; the first map property is a surface area of the given mold; and the second map property is a surface area of the 2D projection of the 3D map.

In some embodiments, the operating parameter of the thermoforming device includes the thermoforming pressure, and the determining the thickness of the precursor aligner comprises: selecting a preliminary thickness value of a preliminary precursor aligner, determining a simulated aligner thickness value based on a simulation of the thermoforming process with the selected preliminary thickness value and the given value of the thermoforming pressure, and selectively executing: in response to the determined simulated aligner thickness value being within a predetermined range of aligner thickness values, determining the selected preliminary thickness value to be the thickness of the precursor aligner; and in response to the determined simulated aligner thickness value being outside of the predetermined range of aligner thickness values, iteratively: selecting one or more of: a different preliminary thickness value as the preliminary thickness value, and a different thermoforming pressure value as the given value of the thermoforming pressure; and simulating the thermoforming process with the one or more selected different preliminary thickness value and the different thermoforming pressure value to determine the simulated aligner thickness, until it is determined that the determined simulated aligner thickness value is within the predetermined range of aligner thickness values encompassing the desired thickness of the desired aligner.

In some embodiments, in response to the determined simulated aligner thickness value being less than the predetermined range of aligner thickness values, the selecting one or more of: a different preliminary thickness value as the preliminary thickness value, and a different thermoforming pressure value as the given thermoforming pressure, comprises: selecting one or more of a greater thickness value among a plurality of predetermined thickness values as the preliminary thickness value, and selecting a lesser thermoforming pressure value as the given value of the thermoforming pressure.

In some embodiments, in response to the determined simulated aligner thickness value being greater than the predetermined range of aligner thickness values, the selecting one or more of: a different preliminary thickness value as the preliminary thickness value, and a different thermoforming pressure value as the given value of thermoforming pressure, comprises: selecting one or more of a lesser thickness value among the plurality of predetermined thickness values as the preliminary thickness value, and selecting a greater thermoforming pressure value as the given value of the thermoforming pressure.

In some embodiments, the method further comprises defining a plane for projecting the 3D map, the parsing the 3D map comprising projecting the 3D map on the plane for generating the 2D projection.

In some embodiments, the method further comprises predetermining the ratio of the first map property value and the second map property value before the obtaining the 3D map.

In some embodiments, the method further comprises, for the thermoforming device, determining a relationship between thermoforming pressure and the ratio.

In some embodiments, the 3D map is representative of the given mold, the method further comprising determining the 3D map of the mold, the determining the 3D map of the mold comprising obtaining a digital image of the mold.

In some embodiments, the operating parameter comprises thermoforming temperature, the method further comprising determining the desired thickness of the aligner based on at least one of: a property of a thermoformable material of the precursor aligner, the property of the thermoformable material relating to a given temperature value of the thermoformable material, and a desired orthodontic treatment for the dental archform.

In some embodiments, the method further comprises determining at least a portion of the desired orthodontic treatment, the orthodontic treatment including a plurality of molds indicative of a plurality of desired shapes of the patient's dental archform at a plurality of points in time, the plurality of molds including the given mold, the determining the at least a portion of the desired orthodontic treatment comprising generating the given mold or a digital model of the mold.

In some embodiments, the method further comprises generating a preliminary thickness value prior to the obtaining the 3D map.

In some embodiments, the method further comprises sending instructions to a robotic system to select the precursor aligner with the determined thickness from a set of precursor aligners with different thicknesses.

In some embodiments, the method further comprises causing the selected precursor aligner to be arranged relative to the thermoforming device for shaping the selected precursor aligner into the desired aligner.

In some embodiments, the method further comprises sending instructions to the thermoforming device to make the desired aligner based on the determined operating parameter.

According to another aspect of the present technology, there is provided a system for determining a manufacturing parameter for making a desired aligner with a desired aligner thickness for a given dental archform. The system comprises a computer system having a processor connectable to a thermoforming device arranged to shape a precursor aligner with a given mold to make the desired aligner. The processor is arranged to execute a method comprising obtaining a 3D map associated with the given dental archform, parsing the 3D map to determine a first map property value and a second map property value, the first map property value being based on the 3D map and the second map property value being derived from a 2D projection of the 3D map, and determining a thickness of the precursor aligner for obtaining the desired aligner thickness based on a ratio of the first map property value and the second map property value and a given value of an operating parameter of the thermoforming device.

In some embodiments, the system further comprises a set of precursor aligners each having one of a plurality of precursor aligner thickness values. The set of precursor aligners includes the precursor aligner with the determined thickness. The processor is arranged to determine the precursor aligner thickness value from the plurality of precursor aligner thickness values.

In some embodiments, the system further comprises a robotic system connected to the processor of the computer system. The robotic system is arranged to select the precursor aligner with the determined thickness from the set of precursor aligners and cause the selected precursor aligner to be arranged relative to the thermoforming device for shaping the selected precursor aligner into the desired aligner.

In some embodiments, the robotic system is further operable to select the given mold among a plurality of molds and cause the given mold to be in the operative relationship with the thermoforming device.

In some embodiments, the system further comprises an imaging device in communication with the processor of the computer system for obtaining a digital image of the mold for determining the 3D map associated with the given dental archform.

In certain aspects, a method for determining a precursor aligner thickness is provided, for making an aligner having an aligner thickness being substantially equivalent to a desired aligner thickness via operation of a thermoforming device using pre-determined operating parameters such as operating pressure and operating temperature, in certain embodiments.

In certain other aspects, a method for determining a simulated aligner thickness is provided, for simulating effective orthodontic loading conditions applicable by an aligner having the simulated thickness onto a given dental archform.

In certain other aspects, a method for determining an orthodontic treatment having a number of sequential treatment steps with a given orthodontic aligner, having a given aligner thickness, is provided. The sequential treatment steps define treatment intervals therebetween. The method, executable by a processor of a computer system, comprises obtaining a segmented 3D map of a plurality of teeth of a patient, the segmented 3D map of each tooth of the plurality of teeth including at least crown portion data; obtaining a start position and a desired end position of each tooth of the plurality of teeth; determining an initial number of sequential treatment steps to move each tooth of the plurality of teeth from the start position to the desired end position, the initial number of sequential treatment steps being based on an initial distance of each treatment interval; for each tooth of the plurality of teeth, and for each treatment interval, determining a root force imposed on a root portion of the given tooth by the given orthodontic aligner; selectively executing: in response to the root force of each tooth of the plurality of teeth not exceeding a predetermined threshold value, determining that the determined initial number of sequential treatment steps is the determined orthodontic treatment; and, in response to the root force, for any one of the teeth of the plurality of teeth, exceeding the predetermined threshold value, iteratively decreasing the initial distance of each treatment interval to provide a revised number of sequential treatment steps, and for each one of the determined revised number of sequential treatment steps re-calculating the root force imposed on the root portion of each tooth by the given orthodontic aligner, until it is determined that the root force, of each tooth of the plurality of teeth, does not exceed the predetermined threshold value.

In some embodiments, determining the root force imposed on the root portion of the given tooth in the given treatment interval comprises: simulating movement of the given tooth within the given treatment interval, based on simulation of the movement of the given tooth from the start position to the desired end position based on the segmented 3D map of the plurality of teeth; determining an impact force of the given orthodontic aligner used during the given treatment interval on the given tooth, based on the simulated movement of the given tooth within the given treatment interval; determining the root force imposed on the root portion of the given tooth, based on the determined impact force and an anatomical consideration of the root portion of the given tooth.

In some embodiments, the re-calculating the root force imposed on the root portion of each tooth by the given orthodontic aligner comprises: determining a revised impact force of the given orthodontic aligner used during the given treatment interval on the given tooth, based on the simulated movement of the given tooth within the given treatment interval; and determining a revised root force imposed on the root portion of the given tooth, based on the revised impact force and the anatomical consideration of the root portion of the given tooth.

In some embodiments, the anatomical consideration of the root portion of the given tooth comprises root portion data including one or more of: a geometry of the root portion, an indication of a length of the root portion, crown portion topography, root portion topography, root portion surface area, and type of tooth.

In some embodiments, the method further comprises obtaining the root portion data by obtaining imaging data of the plurality of teeth, segmenting the imaging data to separate the individual teeth, and parsing the imaging data to separate crown portion data from root portion data.

In some embodiments, the obtaining the segmented 3D map of the plurality of teeth comprises: obtaining 3D imaging data of the plurality of teeth, and digitally separating each tooth of the plurality of teeth in the 3D imaging data to obtain the segmented 3D map of the plurality of teeth.

In some embodiments, the impact force of the given orthodontic aligner is determined based on Finite Element Method (FEM) modelling.

In some embodiments, the FEM modelling comprises imposing boundary conditions which reflect the interaction of an orthodontic aligner with the teeth, caused by contact of the teeth with the orthodontic aligner, during a simulation of the movement of the teeth from the start position to the desired end position.

In some embodiments, the impact force of the given orthodontic aligner is based on one or more of: orthodontic aligner material property, orthodontic aligner configuration, and orthodontic aligner method of manufacture.

In some embodiments, the root force comprises an average force imposed on periodontal ligaments around an entirety of the given tooth root portion.

In some embodiments, the decreasing the initial distance comprises decreasing the initial distance by an amount proportional to an excess amount of the determined root force above the predetermined threshold.

In some embodiments, the method further comprises: determining intermediate collisions between adjacent teeth in the plurality of teeth for each treatment interval between each sequential treatment step of the initial number of sequential steps, the determining intermediate collisions being based on the determined simulated movement of each tooth.

In some embodiments, the method further comprises displaying the determined intermediate collisions on a screen connected to the computer system.

In some embodiments, the method further comprises one or both of: displaying the determined orthodontic treatment on a screen connected to the computer system; sending production instructions to the manufacturing apparatus to generate the orthodontic aligner according to the determined orthodontic treatment.

In some embodiments, the obtaining a start position and a desired end position of each tooth of the plurality of teeth comprises defining the start position and the desired end position of each tooth as an x, y, z coordinate.

In some embodiments, the initial distance is about 200 microns.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is a side view of a schematic illustration of an orthodontic aligner according to certain embodiments of the present technology, shown in use on an upper arch of a subject;

FIG. 2 is a schematic illustration of a cross-section of the orthodontic aligner of FIG. 1 through line 3-3 of FIG. 1, according to certain embodiments of certain aspects of the present technology;

FIG. 3 is a schematic illustration of a cross-section of an orthodontic aligner of the prior art;

FIGS. 12*a* and 12*b* illustrate certain other steps of the method of FIG. 10 for making the orthodontic aligner, according to certain embodiments of the present technology;

Figure 4:
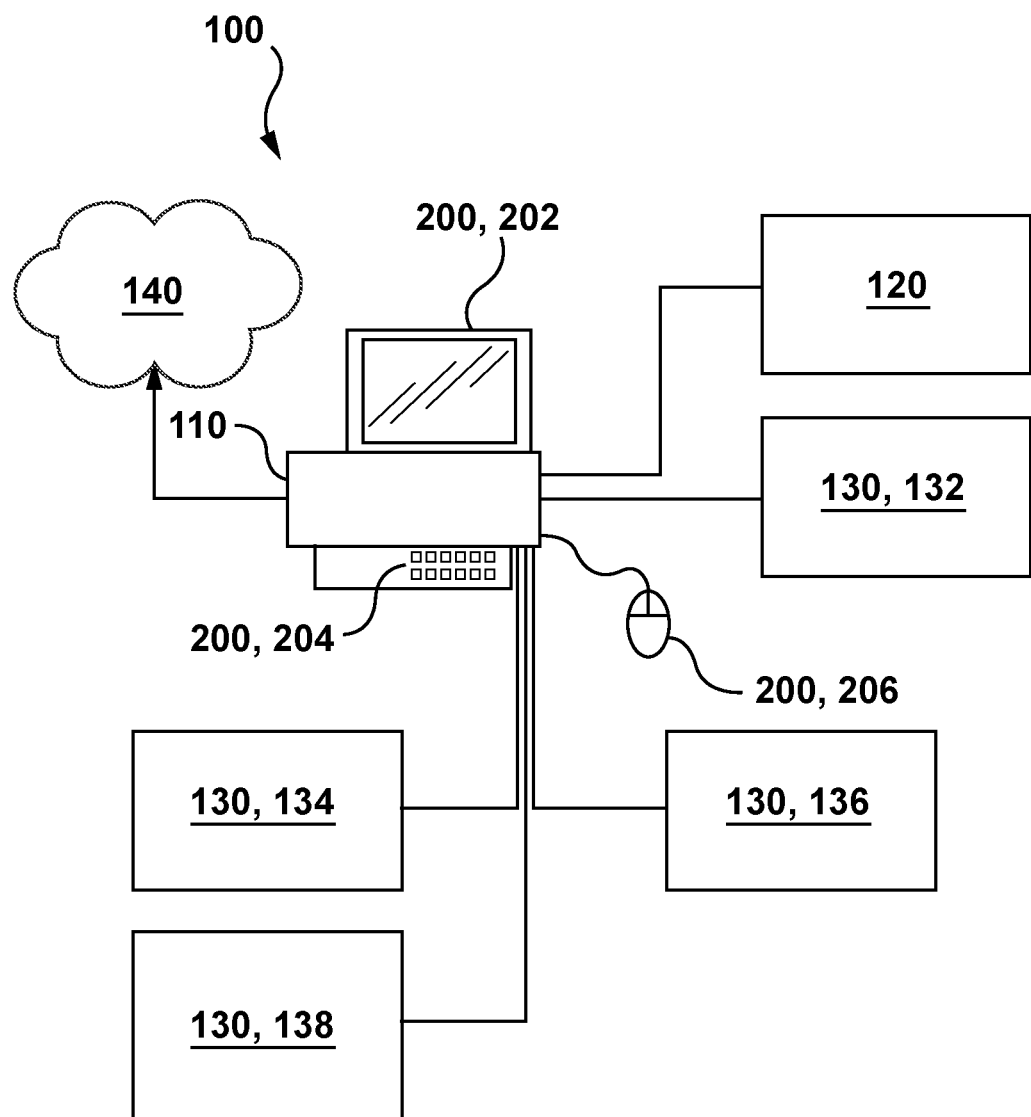
FIG. 4 is a system for making an orthodontic aligner, according to embodiments of an aspect of the present technology.

It should be noted that, unless otherwise explicitly specified herein, the drawings are not to scale and consist in schematic representations of the present technology.

DETAILED DESCRIPTION

Certain aspects and embodiments of the present technology are directed to methods and systems for thermoforming an orthodontic aligner (also referred to as "aligner"), as well as to the aligner itself. More specifically, certain aspects and embodiments of the present technology comprise a computer-implemented method and systems for determining operating parameter(s) for making the orthodontic aligner by thermoforming.

Certain embodiments of the present technology minimize, reduce or avoid some of the problems noted with the prior art, for example, in certain embodiments of the aligner obtained by embodiments of the present methods and systems, one or more of the following improvements are obtained: the ability to make an aligner having a configuration matching a desired configuration, the ability to make an aligner having a thickness matching a desired thickness, the ability to make an aligner with a capacity to withstand given orthodontic loading conditions, and the ability to make the desired aligner for efficiency of the planned orthodontic treatment. In certain embodiments, experimental trial and error is not required to make the aligner having a configuration with the desired configuration.

This is achieved in certain embodiments of the present technology by the provision of a given thermoformed aligner for a given orthodontic treatment stage, the given aligner having a thickness substantially equal to a desired thickness determined based on which given loading conditions of the given orthodontic treatment stage were determined.

Referring initially to FIGS. 1 and 2, there is shown an aligner 10 made according to certain aspects and non-limiting embodiments of the present technology. In this embodiment, the illustrated aligner 10 is for an upper dental arch 12 (also referred to as "upper arch") of a subject (also referred to as "patient"). The upper arch 12 comprises upper teeth 22 and upper gums 26. In other embodiments (not shown), the aligner 10 is provided for the lower dental arch of the subject. In yet other embodiments, aligners 10 for both the lower arch and the upper arch 12 are provided.

The aligner 10 comprises an aligner body 14 having an inner surface 16 and an outer surface 18. The inner surface 16 defines a channel 20 for receiving at least some teeth 22 of the upper arch 12. At least one edge 24 of the channel 20 is shaped for intimately following the subject's gums along a gumline 26 of the subject. In the embodiment of FIGS. 1 and 2, the aligner 10 is arranged to receive all the upper teeth 22 of the upper arch 12 of the subject.

As best seen in FIG. 2, the aligner body 14 includes occlusal 34, oral 36 and buccal 38 regions. According to certain embodiments, a thickness 40 of the aligner body 14, measurable from the inner surface 16 to the outer surface 18 along a direction substantially normal to the inner surface 18, is substantially uniform across the aligner body 14.

In certain embodiments, the thickness 40 of the aligner is about 0.7 mm. In certain other embodiments, the thickness 40 of the aligner is selected from 0.7 mm, 0.75 mm, 0.8 mm, 0.85 mm, 0.9 mm, 0.95 mm, and 1.0 mm. In certain embodiments, the aligner body 14 has at least one interdental region 42 (FIG. 1) being thicker than the thickness 40. Indeed, during the thermoforming process, a surplus of material may accumulate in a concave portion of the mold representing an interdental space, defining the interdental region 42 of the aligner body 14.

The aligner 10, as well a precursor aligner 44 (shown in FIG. 7) from which the aligner 10 is formed, is made of a polymer, such as a thermoplastic material. In certain embodiments, the aligner 10 is made of poly-vinyl chloride (PVC). In certain other embodiments, the aligner 10 is made of polyethylene terephthalate glycol (PETG). Other suitable materials can also be used to form the aligner 10. In the case of PETG and PVC, the aligner 10 is substantially transparent. The aligner 10 and/or the precursor aligner 44 may be made of other materials having intrinsic properties that are typically desirable in aligners 10, such as those having low surface roughness, high translucency and mechanical strength adapted for bearing typical orthodontic loads.

It will be appreciated that the present technology can be applied to make different types, shapes, sizes and configurations of orthodontic aligners 10. For example, in certain other embodiments, the channel 20 is arranged to receive some, not all, of the teeth 22 of the lower arch or the upper arch 14. In some embodiments, the aligner 10 may further include retentive features (not shown) for retaining the aligner 10 with respect to the teeth 22. Such retentive elements can be for example aligner blocks extending outwardly from its inner surface to engage the teeth 22. Other such retentive elements can be aligner recesses extending inwardly of its inner surface 16 and sized to engagingly receive blocks affixed to the teeth 22.

It will also be appreciated that the orthodontic aligner 10 may be used in treatments devised for treating different conditions related to teeth misalignment or malocclusion, including but not limited to one or more of: tooth rotation, tooth intrusion/extrusion, tooth translation, and interdental space management (i.e., closing embrasures and/or creating interproximal contacts, or opening embrasures and/or eliminating interproximal contacts), to name a few.

Certain advantages of the aligner 10 obtained through aspects and embodiments of the present technology, compared to those of the prior art, are noted below.

Thermoformed aligners 10a of the prior art (FIG. 3) may present aligner body 14a defects due to excessive or inadequate plastic deformation occurring during the thermoforming process. As such, discrepancies may be found among aligner body 14a thickness measurements made at occlusal 34a, oral 36a and buccal 38a regions. It should be noted that such defects may be present in portions of the aligner body 14a intended for imparting desired loading conditions via adjacent portions of the teeth and/or via adjacent aligner fixtures attached to the teeth. Discrepancies in thickness may be found in any other portion of the aligner body 14a of the prior art.

Under certain circumstances, such defects may reduce the effectiveness of the defective aligner 10a in moving the teeth 22 and/or even cause inadequate movement of the teeth 22. This is because the efficacy of the desired orthodontic treatment, which may have been designed using computer software-based treatment simulations, is based at least in part on the configuration of the as-made aligner (such as is shape and thickness) matching the configuration of the aligner used in the simulations.

For the aligners 10 made using certain embodiments and aspects of the present technology, the occlusal 34, oral 36 and buccal 38 regions of the aligner body 14 respectively have the thickness 40 consistent with the desired thickness as factored in the treatment simulation, thereby alleviating at least some of the problems noted in the prior art.

Furthermore, consistency of the thickness 40 may impart the aligner 10 with the ability to withstand certain undesirable, yet typical loads which may otherwise cause failure of the aligner 10, either via plastic deformation or rupture. For example, removal of the aligner 10 from a subject's arch is typically initiated by separating a distal portion from its underlying tooth. In doing so, bending of the aligner body 14 occurs, causing tensile stress at edge 24. A thickness 40 less than the desired thickness at this portion, would result in a concentration of the stress greater than predicted in the treatment simulation. Therefore, the aligner 10 may have a shorter lifetime than predicted or the desired treatment would deviate from the desired treatment.

Hereinbelow and with reference to FIGS. 4-6, one embodiment of a system 100 suitable for making the aligner 10 according to aspects and embodiments of the present technology will be described.

It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

In certain embodiments, the system 100 of FIG. 4 comprises a computer system 110 for implementing embodiments of a method 300 of the present technology. The computer system 110 is configured to determine a manufacturing parameter for making the aligner 10 with the desired aligner thickness using a thermoforming method.

Accordingly, the system 100 further comprises a manufacturing apparatus 130 for making the aligner 10, operatively communicable with the computer system 100. In certain embodiments, the manufacturing apparatus 130 includes a thermoforming device 132 (FIG. 6) for shaping the precursor aligner 44 into the aligner 10 using an aligner mold 46 (FIGS. 7-9), by a process which will be described in further detail hereinbelow.

In some embodiments, the manufacturing apparatus 130 further comprises a computer-assisted post-processing device 134, such as a computer numerical control (CNC) milling device or a CNC laser cutting device for further shaping the aligner 10 into a post-processed aligner (not shown). The post-processing of the aligner 10 may include one or both of (i) forming recesses or openings in the aligner body 14, and (ii) forming the edge 24 of the channel 20. In some such embodiments, the post-processing device 134 is operatively connectable to the computer system 110 for receiving operating instructions from the computer system 110 for post-processing the aligner 10. The operating instructions may for example be derived from a digital model indicative of a desired aligner (not shown).

Figure 9:
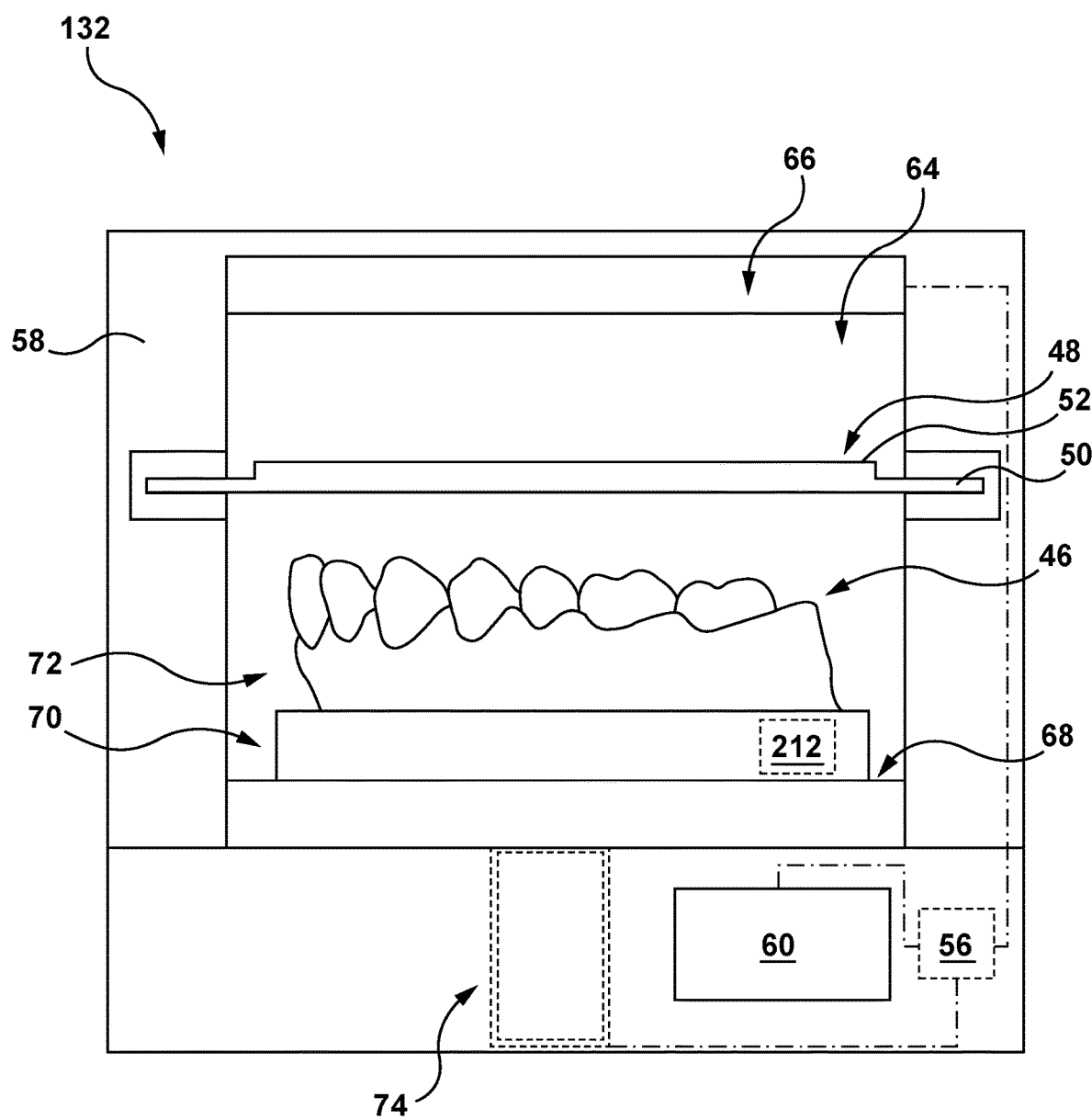
FIG. 9 is the thermoforming device and the aligner mold of FIG. 7, shown with a customized precursor aligner according to other embodiments of the present technology.

In some embodiments, the manufacturing apparatus 130 further comprises an auxiliary manufacturing device 136 for making the aligner mold 46. The auxiliary manufacturing device 136 is an additive manufacturing device, although it is contemplated that, in other embodiments, a CNC milling device may be used instead. In certain embodiments, an auxiliary manufacturing device may be used for making the precursor aligners 48, for example an additive manufacturing device arranged for fabricating customized precursor aligners 48 (FIG. 9). Such customized precursor aligners 48 may differ from the precursor aligner 44 by having a layer wise construction, including a first layer 50, and a second layer 52, and having varying properties across the first layer 50 and the second layer 52, including thickness and material types.

In some embodiments, the computer system 110 is configured to receive image data pertaining to the subject or to a given orthodontic treatment (such as a digital model of the aligner 10). The computer system 110 may use the image data for determining the thermoforming parameters. In certain embodiments, the computer system 110 is arranged to determine an orthodontic treatment using the image data.

It should be noted that the computer system 110 can be configured for receiving image data from a vast range of devices. Some such devices can be used for capturing and/or processing data pertaining to maxillofacial and/or cranial anatomy of a subject. In certain embodiments, the image data received from such devices is indicative of properties of anatomical structures of the subject, including: teeth, intraoral mucosa, maxilla, mandible, temporomandibular joint, and nerve pathways, among other structures. In some embodiments, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some embodiments, the image data includes cephalometric image datasets. In some embodiments, the image data includes datasets generally intended for the practice of endodontics. In some embodiments, the image data includes datasets generally intended for the practice of periodontics.

The image data may include two-dimensional (2D) data and/or tridimensional data (3D). In certain embodiments, the image data includes at least one dataset derived from one or more of the following imaging modalities: computed tomography (CT), radiography, magnetic resonance imaging, ultrasound imaging, nuclear imaging and optical imaging. Any medical imaging modality is included within the scope of the present technology. In certain embodiments, the image data includes 2D data, from which 3D data may be derived, and vice versa.

In certain embodiments, the system 100 optionally further comprises an imaging device 120 operatively coupled to the computer system 110 and which is arranged to provide the image data to the computer system 110.

In certain embodiments, the imaging device 120 includes an image capture sensor for capturing imaging data and a processor arranged to receive, and transmit the imaging data. The processor may be further configured to process the image data to generate digital, 3D models based on the image data, for example. Alternatively, it is contemplated that the processing of the image data may be performed by the computer system 110. The resulting image data received by the computer system 110 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology.

In certain embodiments, the image data can be provided to the computer system 110 in a different way, such as via a storage device (not shown) or via a communication network (not shown).

In certain embodiments, the imaging device 120 is an intraoral scanner for direct digitization of the upper arch 12 and any other relevant intraoral anatomy. The computer system 110 is connected to the imaging device 120 for receiving image data including a digital, 3D surface model of a subject's intraoral anatomy.

Alternatively, as contemplated in other embodiments, the imaging device 120 may instead be a desktop scanner (not shown) for indirect digitization of intraoral anatomy via a replica (i.e., a dental model). In some such embodiments, the replica is obtainable via a dental impression (i.e., a negative mold) made of a material (such as polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica. The replica may then be retrieved from the dental impression and digitized by the desktop scanner to generate the digital surface model. Alternatively, in other embodiments, the digital surface model may be generated via digitizing the dental impression.

In certain embodiments, the system 100 further includes a robotic system 138 arranged relative to the thermoforming device 132, for handling one or more of the aligner mold 46, the precursor aligner 44, and the aligner 10.

In certain embodiments, the computer system 110 is connectable to one or more of the imaging device 120, the thermoforming device 132, the post-processing device 134, the auxiliary manufacturing device 136 and the robotic system 138 via a communication network. In some embodiments, the communication network is the Internet and/or an Intranet. Multiple embodiments of the communication network may be envisioned and will become apparent to the person skilled in the art of the present technology.

Figure 5:
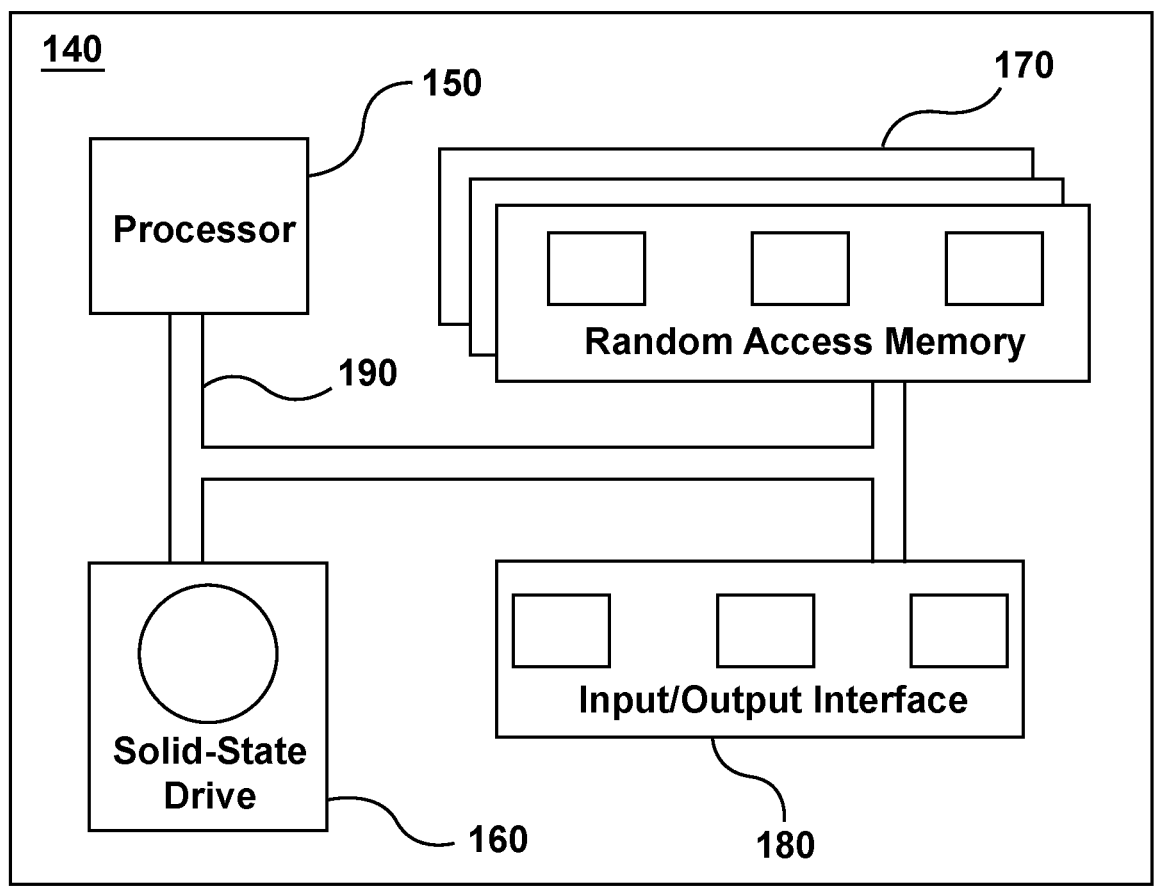
FIG. 5 is a computer system of the system of FIG. 4, according to certain embodiments of the present technology.
Figure 6:
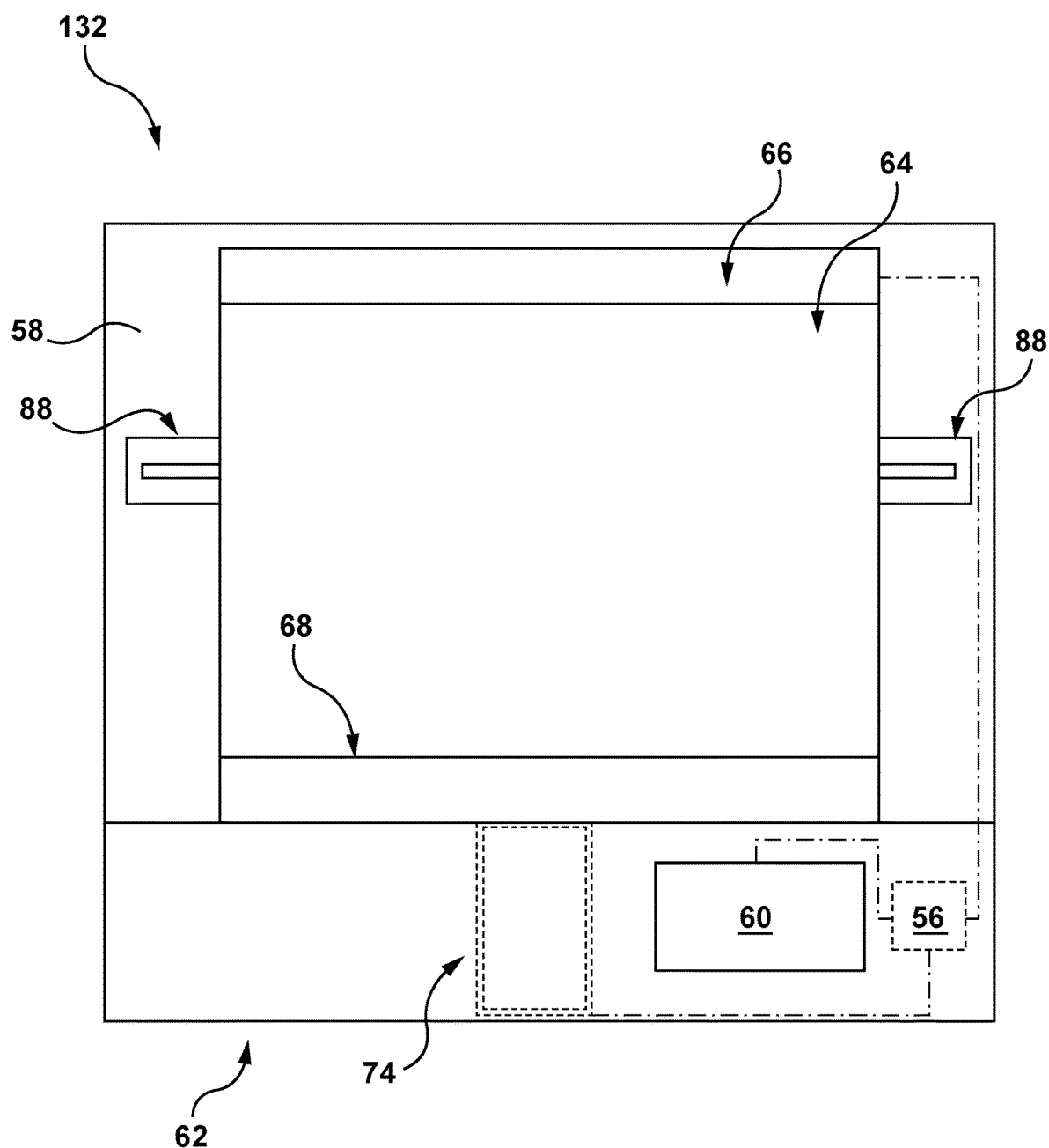
FIG. 6 is a thermoforming device of the system of FIG. 4 when viewed from a front side, according to certain embodiments of the present technology.

Turning now to FIG. 5, certain embodiments of the computer system 110 have a computing environment 140 as illustrated schematically. The computing environment 140 comprises various hardware components including one or more single or multi-core processors collectively represented by a processor 150, a hard drive 160 in this case being a solid-state drive 160, a random access memory 170 and an input/output interface 180. Communication between the various components of the computing environment 140 may be enabled by one or more internal and/or external buses 190 (e.g. a PCI bus, universal serial bus, IEEE 1394 "Firewire" bus, SCSI bus, Serial-ATA bus, ARINC bus, etc.), to which the various hardware components are electronically coupled.

The random access memory 170 is configured in any known manner and arranged to store one or more of: set-up data, subject data, subject medical records of one or more subjects, digital anatomy representation data of the one or more of the subjects, and orthodontic treatment data. The orthodontic treatment data comprises, for example, material properties (e.g. chemical properties, mechanical properties, optical properties) of different materials for use in making aligners, number of treatment stages, information on the aligners to be used in the treatment stages, durations of the treatment stages, desired total treatment duration, and the like. Other data relating to any type of orthodontic treatment or aligner 10 can also be included in the random access memory 170. In some embodiments, the above-mentioned data may also be stored in the solid-state drive 160 in a manner that is suitable for being loaded into the random access memory 170.

The input/output interface 180 allows enabling networking capabilities such as wire or wireless access. As an example, the input/output interface 180 comprises a networking interface such as, but not limited to, a network port, a network socket, a network interface controller and the like. Multiple examples of how the networking interface may be implemented will become apparent to the person skilled in the art of the present technology.

For example, but without being limiting, the networking interface 180 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 160 stores program instructions suitable for being loaded into the random access memory 170 and executed by the processor 150 for executing the methods 300 according to certain aspects and embodiments of the present technology. For example, the program instructions may be part of a library of instructions and/or part of a software application.

In this embodiment, the computing environment 140 is implemented in a generic computer system which is a conventional computer (i.e. an "off the shelf" generic computer system). The generic computer system is a desktop computer/personal computer, but may also be any other type of electronic device such as, but not limited to, a laptop, a mobile device, a smart phone, a tablet device, or a server.

In other embodiments, the computing environment 140 is implemented in a device specifically dedicated to the implementation of the present technology. For example, the computing environment 140 is implemented in an electronic device such as, but not limited to, a desktop computer/personal computer, a laptop, a mobile device, a smart phone, a tablet device, a server, specifically designed for making aligners. The electronic device may also be dedicated to operating other devices, such as one or more of the imaging device 120, the thermoforming device 132, the post-processing device 134, the auxiliary manufacturing device 136 and the robotic system 138.

In some embodiments, the computer system 110 is connected to one or more of the imaging device 120, the thermoforming device 132, the post-processing device 134 and the auxiliary manufacturing device 136. In some alternative embodiments, the computer system 110 or the computing environment 140 is implemented, at least partially, on one or more of the imaging device 120, the thermoforming device 132, the post-processing device 134, the auxiliary manufacturing device 136 and the robotic system 138. In some alternative embodiments, the computer system 110 or the computing environment 140 may be hosted, at least partially, on a server. In some alternative embodiments, the computer system 110 or the computing environment 140 may be partially or totally virtualized through cloud architecture.

Figure 11:
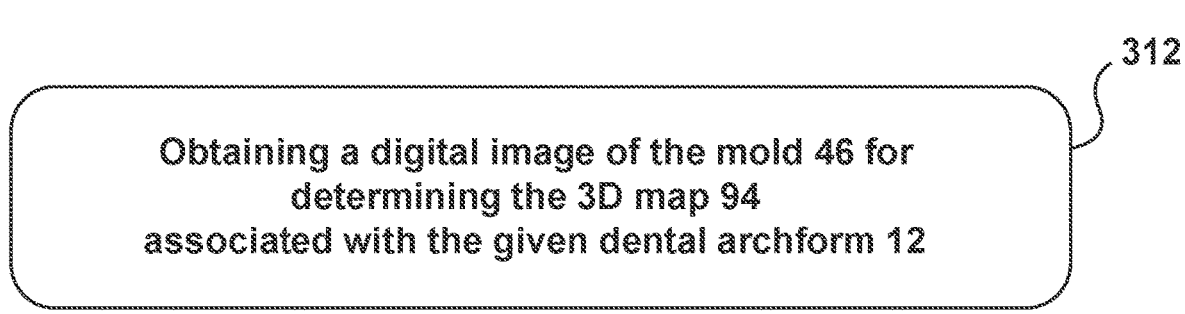
FIG. 11 illustrates certain other steps of the method of FIG. 10 for making the orthodontic aligner, according to certain embodiments of the present technology.
Figure 13:
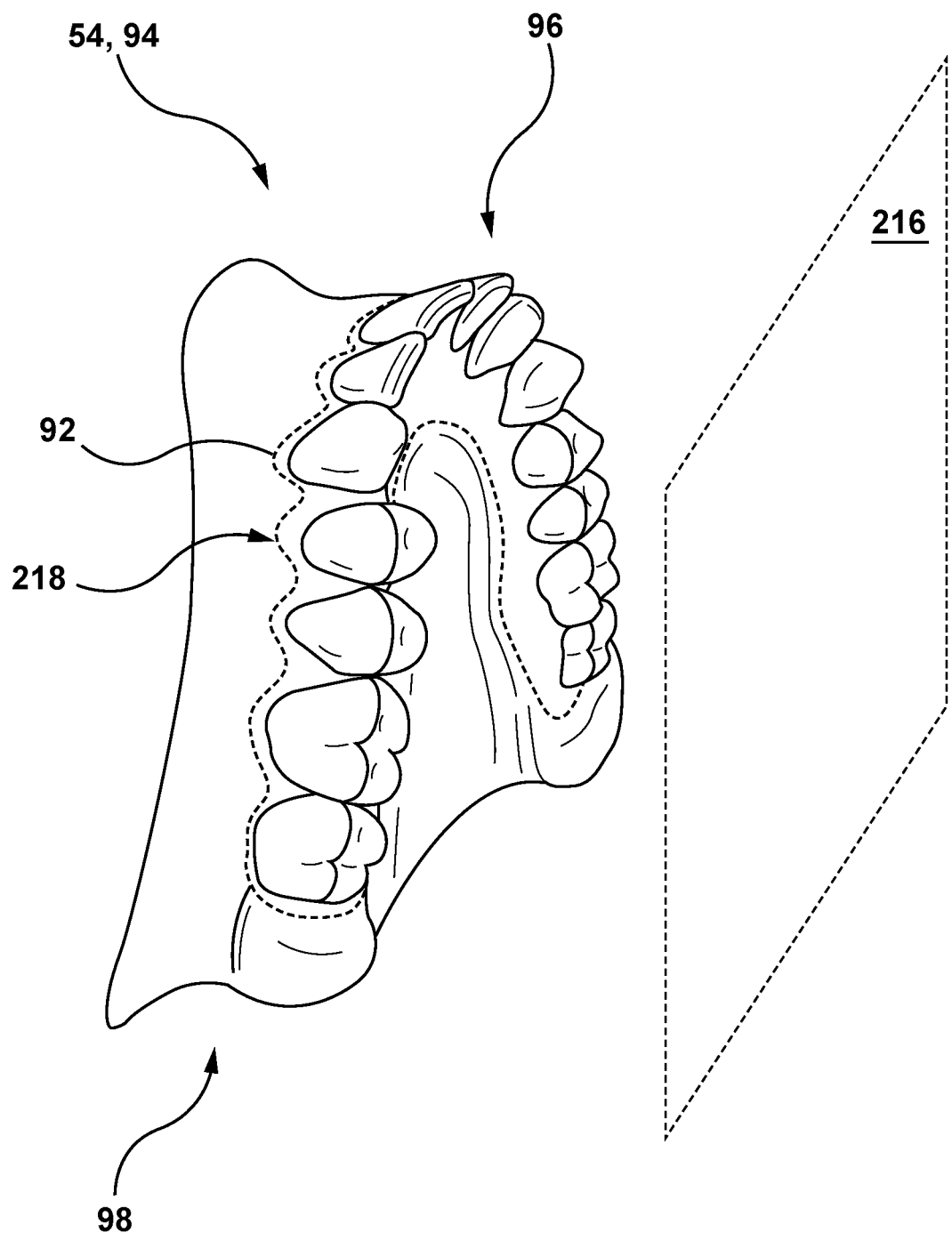
FIG. 13 illustrates a digital model of an upper arch and a plane used during the method of FIG. 10, according to certain embodiments of the present technology.

Referring back to FIG. 4, the computer system 110 has at least one interface device 200 for providing an input or an output to a user of the system 100. In the embodiment of FIG. 4, the interface device 200 includes a screen 202 for providing a visual output to the user of the system 100, the visual output including one or more images pertaining to the manufacturing of the aligner, information relating to the thermoforming device, orthodontic treatment plan, including images of: photos of the lower arch and/or the upper arch 14, a digital model of the lower arch and/or the upper arch 14 in a current teeth configuration, a digital model of the lower arch and/or the upper arch 14 in a desired teeth configuration, a digital model of a desired aligner, a digital model 54 (FIG. 11) of the aligner mold 46, and a digital model of a precursor aligner (not shown). Other data related to the orthodontic treatment plan may also be included in the visual output, for example measurements (e.g., distances between anatomical landmarks, angulation between teeth), geometry (e.g., an occlusal plane) and identifiers (e.g., teeth site numbers, subject identifier). The visual output may also include visual data pertaining to operation to any one of the imaging device 120, the thermoforming device 132, the post-processing device 134, the auxiliary manufacturing device 136 and the robotic system 138. The interface device 200 also includes a keyboard 204 and a mouse 206 for receiving input from the user of the system 100. The interface device 200 may include, in certain embodiments, other devices for providing an input to the computer system 110 such as, without limitation, a USB port, a microphone, a camera or the like.

Users of the computer system 110, in certain embodiments, are practitioners and staff of a given clinic. The computer system 110 may also be connected to clinical practice management software which could be used for patient appointment scheduling, inventory management (e.g., for managing stocks of precursor aligners) and other tasks based on the given orthodontic treatment and/or in view of other activities and needs of the clinic. It is also contemplated that the computer system 110 may also be arranged for being used remotely, such as by users of other clinics, for example via server or cloud environment.

In some embodiments, the computing environment 140 is distributed amongst multiple systems, such as one or more of the imaging device 120, the thermoforming device 132, the post-processing device 134, the auxiliary manufacturing device 136, the robotic system 138 and/or the server or cloud environment. In some embodiments, the computing environment 140 may be at least partially implemented in another system, as a sub-system for example. In some embodiments, the computer system 110 and the computing environment 140 may be geographically distributed.

As persons skilled in the art of the present technology may appreciate, multiple variations as to how the computing environment 140 is implemented may be envisioned without departing from the scope of the present technology.

Referring now to FIGS. 6 to 9, in which the thermoforming device 132 is schematically represented according to certain embodiments of the present technology. The thermoforming device 132 is arranged to receive the aligner mold 46 and the precursor aligner 44, and to shape the precursor aligner 44 onto the aligner mold 46 during a thermoforming operation, in which heat and pressure imparted to the precursor aligner 44 during shaping are controlled.

The thermoforming device 132 has a device body 58 housing a control unit 56. The control unit 56 is arranged to receive a signal indicative of operating instructions from the computer system 110. The control unit 56 can also be arranged to receive a signal indicative of operating instructions from a user interface 60 connected to the device body 58. Based on the signal, the control unit 56 selectively causes the thermoforming device 132 to operate according to one or more given operating parameters (e.g., thermoforming temperature, thermoforming pressure) values, as will be further described hereinbelow.

The device body 58 defines a chamber 64 having a base 62 on which the aligner mold 46 may be supported. The chamber 64 is sized for receiving the aligner mold 46 and the precursor aligner 44.

Figure 7:
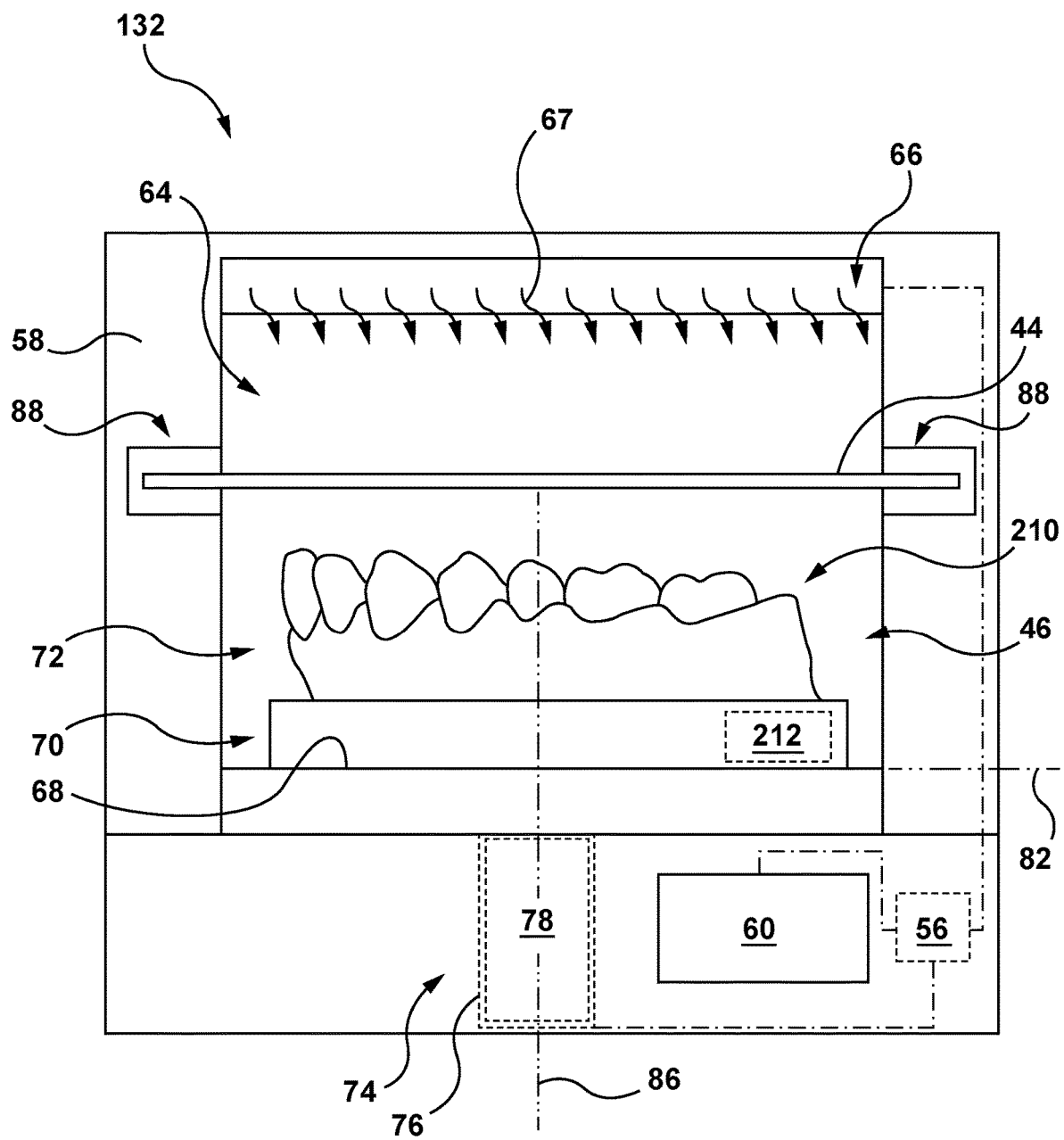
FIG. 7 is the thermoforming device of FIG. 6, shown with an aligner mold and a precursor aligner, according to certain embodiments of the present technology.

As best seen in FIG. 7, the aligner mold 46 has a base portion 70 and an anatomic portion 72. The base portion 70 comprises a code-bearing portion 212 bearing a code indicative of the aligner mold 46. It is contemplated that the code-bearing portion 212 could be disposed elsewhere on the aligner mold 46. The anatomic portion 72 is adjacent the base portion 70 and comprises a teeth portion 96 representing teeth of the subject being disposed in a desired configuration as determined per the given orthodontic treatment plan. The anatomic portion also comprises a mucosa portion 98 including a shape of the gingiva and gumline 26 adjacent the teeth 22 of the subject. The mucosa portion 98 may also include a shape of vestibular tissue and/or oral cavity-lining tissue, although it does not have to be the case. The teeth portion 96 of the aligner mold 46 comprises at least a crown portion. Some root portions may also be at least partially visible, for example via sulci defined between the teeth portion 96 and the mucosa portion 98. The teeth and mucosa portions 96, 98 together are inclusive of a portion of the anatomic portion 72 of the aligner mold 46 representing a shaping portion 210 of the aligner mold 46 to be used for shaping the precursor aligner 44.

The thermoforming device 132 also includes a heating element 66 for generating heat 67 inside the chamber 64. Moreover, the heating element 66 is operable for selectively adjusting its heating temperature based on a desired thermoforming temperature value. The control unit 56 is electronically connected to the heating element 66 for selectively causing the heating temperature to be adjusted based on the desired thermoforming temperature value. In this embodiment, the thermoforming device 132 has a range of thermoforming temperature values between about 180 Celsius and 260 Celsius.

The platform 68 and the heating element 66 are configured relative to one another such that when the base portion 70 of the aligner mold 46 is disposed on the platform 68, the anatomic portion 72 of the aligner mold 46 faces the heating element 66. The thermoforming device 132 includes a pneumatic actuator 74 in fluid connection with a compressor (not shown). The pneumatic actuator has a fixed portion 76 connected to the body 58 and a movable portion 78 connected to the platform 68. The movable portion 78 is slidably connected to the fixed portion 76. The pneumatic actuator 74 is structured for converting energy in the form of pressure received from the compressor into a pushing force 80 for moving its movable portion 78 relative to its fixed portion 76. The pneumatic actuator 74 is controllable for selectively limiting the pressure imparted by the compressor based on a desired thermoforming pressure value so as to selectively move the movable portion 78. The control unit 56 is electronically connected to the pneumatic actuator 74 for selectively causing the movable portion 78 to be moved by the pushing force 80, the pushing force 80 being commensurate to the selected desired thermoforming pressure value. In this embodiment, the desired thermoforming pressure value is selectable between 2 Bar and 10 Bar. The pneumatic actuator 74 is operatively connected to the platform 68, via the movable portion 78, for moving the platform 68 relative to the chamber 64 from a first platform position 82 (FIG. 7) to a second platform position 84 (FIG. 8) along a thermoforming axis 86, the second platform position 84 being closer to the heating element 66. Also, it should be noted that the heating element 66 is configured relative to the chamber 64 so as to remain spaced from the platform 68 when the platform 68 is in either of the first 82 or the second platform positions 82, 84. In other embodiments, other types of actuators, such as hydraulic and electric actuators, are contemplated as alternatives to the pneumatic actuator 74.

The thermoforming device 132 also includes a securing mechanism 88 (not shown in detail) configured for retaining a position of the precursor aligner 44 in the chamber 64, particularly during the thermoforming operation. In this case, the securing mechanism 88 is a clamp. In other embodiments, the securing mechanism 88 can be arranged to retain the precursor aligner 44 in a different manner. The securing mechanism 88 is arranged relative to the heating element 66 such that when the precursor aligner 44 is being retained by the securing mechanism 88, the precursor aligner 44 can be exposed to heat radiating from the heating element 66 to cause a material temperature of the precursor aligner 44 to increase to a temperature substantially equivalent to the desired thermoforming temperature.

In some embodiments, the securing mechanism 88 is configurable between an open configuration for removably receiving the precursor aligner 44 and a closed configuration for retaining the precursor aligner 44. The control unit 56 is electronically connected to the securing mechanism 88 for selectively causing the securing mechanism 88 to be configured in the open configuration or in the closed configuration.

Robotic System

In certain embodiments in which the system 100 comprises the robotic system 138, the robotic system 138 is positioned proximate a plurality of precursor aligners 44 (not shown). The plurality of precursor aligners 44 may comprise a plurality of precursor aligners 44 having different thicknesses or other dimensions. The robotic system 138 may be provided as a kit with the plurality of precursor aligners 44. The robotic system 138 may also comprise a stack of aligners 10 thus produced by the thermoforming device and moved from the thermoforming device 132 by the robotic system 138. There may also be provided a plurality of different aligner molds 46. In certain embodiments, the aligner mold 46 and the precursor aligner 44 are positioned proximate the thermoforming device 132, together with a plurality of aligner molds 46 and a plurality of precursor aligners (not shown).

The robotic system 138 is arranged to automate or at least partially automate movement of one or more of: aligner molds 46, precursor aligners 44, and formed aligners 10, to and/or from the thermoforming device 132. The robotic system 138 (details of which are not illustrated) includes at least one robotic arm having an end effector. The end effector may include a gripper for gripping the aligner mold 46. The robotic system may further comprise a vision sensor for detecting the aligner mold 46. A processor of the robotic system 138, or the processor 150 of the computer system 110, can control the movement of the robotic arm and gripper according to the detected aligner mold 46.

The robotic system 138 is configured to selectively displace one or more of the robotic arm, the end effector or the vision system to a desired position. For instance, the vision sensor is arranged for detecting properties of a detected aligner mold 46 (e.g., mold height, mold identification code).

The computer system 110 is electronically connected to the vision sensor for receiving a vision signal indicative of the detected aligner mold 46. In certain embodiments, based on the vision signal, the computer system 110 is arranged to identify the aligner mold 46 among the plurality of aligner molds 46. The computer system 110 is also electronically connected to the gripper for causing the gripper to grip the aligner mold 46, for example via its base portion 70, among the plurality of aligner molds 46 and for causing the robotic system 138 to move the aligner mold 46 to an installed position on the platform 68 of the thermoforming device 132.

In certain embodiments, the vision sensor is arranged to detect properties of a sensed precursor aligner 44 (e.g., thickness, precursor aligner identification code). The computer system 110 is electronically connected to the vision sensor for receiving a vision signal indicative of the detected precursor aligner 44. Further, based on the vision signal, the computer system 110 is arranged to identify the precursor aligner 44 among the plurality of stocked precursor aligners. The computer system 110 is also electronically connected to the gripper of the robotic system 138 for causing the gripper to pick the precursor aligner 44 among the plurality of stocked precursor aligners and for causing the robotic system 138 to move the precursor aligner 44 from its stocked position to a position relative to the securing mechanism 88 of the thermoforming device 132 such that it may be secured thereto.

In some embodiments, the robotic system 138 includes a plurality of robots, each robot of the plurality of robots having, respectively, at least one of the end effectors of the robotic system 138.

In some embodiments, the vision sensor or the computer system 110 is arranged to generate the digital model 54 of the aligner mold 46 (i.e., a 3D aligner mold map 54). In some such embodiments, the imaging device 120 comprises the vision sensor of the robotic system 138.

In some embodiments, the end effectors of the robotic system 138 include a cutting device (e.g., a $CO_2$ laser) configured for excising material from the aligner 10, for example a remainder of material 90 of the precursor aligner 44 extending away from the aligner 10 after being shaped onto the aligner mold 46. The remainder of material 90 extends outwardly of the aligner 10 from a virtual boundary 92 (FIG. 8) indicative of the edge 24 of the channel 20 of the aligner 10. In some such embodiments, the auxiliary manufacturing device 136 comprises the robotic system and the cutting device.

Method

With reference to FIGS. 10 to 17, in certain embodiments the computer system 110 is configured to execute the method 300 for determining a manufacturing parameter for making the aligner 10 with a desired aligner thickness using the thermoforming device 132. Embodiments of the method 300 will now be described in further detail below.

Step 310: Obtaining a 3D Map Associated with a Given Dental Archform

Figure 10:
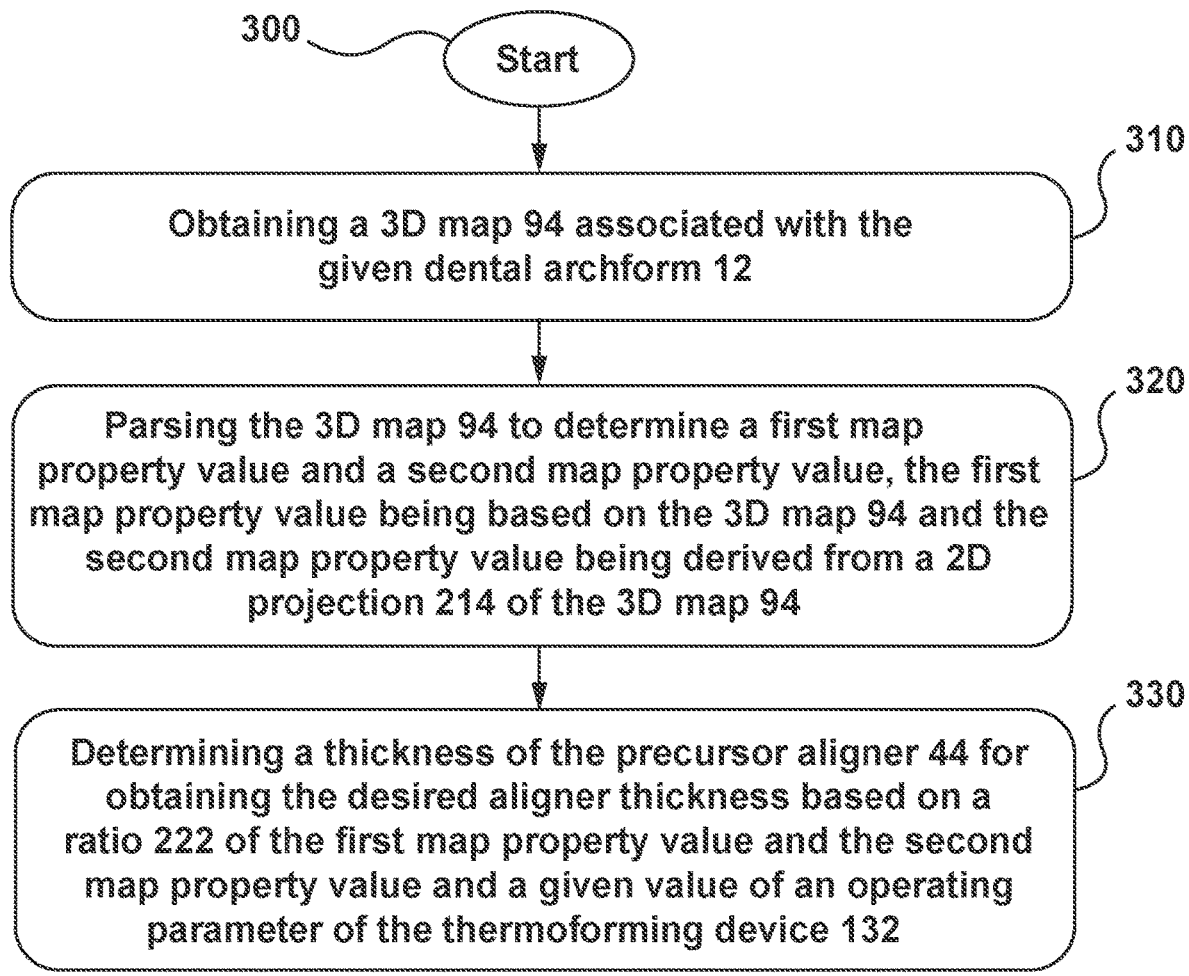
FIG. 10 illustrates method steps for making the orthodontic aligner, according to certain embodiments of another aspect of the present technology.

Referring to FIG. 10, the method 300 commences, in certain embodiments, in Step 310 by obtaining a 3D map 94 (FIG. 13) associated with a given dental archform relating to, for example, the upper dental arch 12 (FIG. 1). The 3D map is also known as a three-dimensional representation or three-dimensional digital model of the given dental archform. It should be understood that, in accordance with a given orthodontic treatment plan specific to a given subject, the given dental archform 12 may relate to either one of the upper dental arch 12 or the lower dental arch (not shown) of the given subject, based on which one the aligner 10 relates to. It should be noted that certain methods of determining such orthodontic treatment plans is further described in U.S. Ser. No. 16/132,995, the contents of which are hereby incorporated by reference.

In this embodiment, the given dental archform 12 relates to the upper dental arch 12 of the given subject, as best seen in FIG. 1.

In certain embodiments, the 3D map 94 is representative of the aligner mold 46. The 3D map 94 comprises at least the shaping portion 210 (FIGS. 7, 8) of the aligner mold 46 to be used for shaping the precursor aligner 44.

Figure 8:
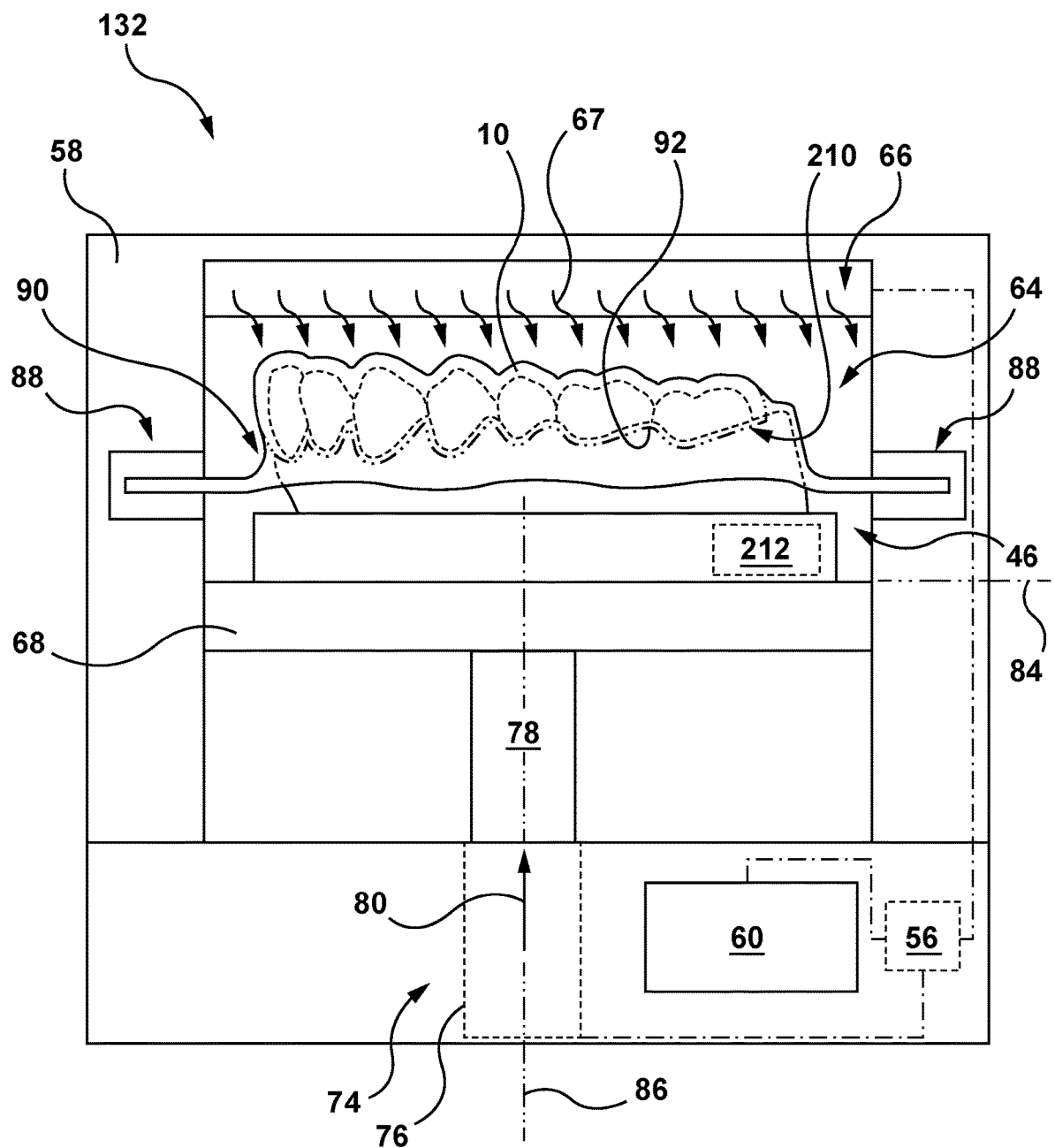
FIG. 8 is the thermoforming device, the aligner mold and the precursor aligner of FIG. 7, with the precursor aligner shown deformed, according to certain embodiments of the present technology.

In such embodiments, the method 300 comprises before Step 310, in Step 312 (FIG. 11), by obtaining a digital image of the aligner mold 46 (i.e., the 3D map 94). In some such embodiments, the digital image of the aligner mold 46 is obtained by digitizing at least a portion of the aligner mold 46 via the imaging device 120. For example the at least a portion may comprise at least one of the shaping portion 210 and the code-bearing portion 212 (FIGS. 7-9). In some such embodiments, the method 300 continues with the processor 150 of the computer system 110 determining the 3D map 94 associated with the given archform 12 based on the digital image of the aligner mold 46. In some such embodiments, based on the obtained digital image of the aligner mold 46, the processor 150 of the computer system 110 determines which one of a plurality of 3D maps stored on the computer system 110, either on its drive 160 or its memory 170, for example, is the 3D map 96, provided that the plurality of 3D maps includes the 3D map 96.

In yet other embodiments, the method 300 comprises obtaining the digital image of the given archform 12 (i.e., the 3D map representative of the given archform 12 in a preceding configuration in the given orthodontic treatment plan, the desired configuration of the archform 12 to be attained by applying the aligner 10 onto the given archform 12 of the subject). In some such embodiments, the digital image of the given archform 12 is obtained by digitizing the given archform 12 via the imaging device 120. The determining the 3D map associated with the given archform 12 is performed by the computer system 110 in certain embodiments. The processor 150 of the computer system 110 may also be arranged to execute method steps for simulating an orthodontic treatment to determine the 3D map 94 based on the digital image of the given dental archform 12.

Step 320: Parsing the 3D Map to Determine a First Map Property Value and a Second Map Property Value, the First Map Property Value being Based on the 3D Map and the Second Map Property Value being Derived from a 2D Projection of the 3D Map Referring back to FIG. 10, the method 300 continues with Step 320 in which the 3D map 94 is parsed to determine a first map property value and a second map property value. In certain embodiments, the first property value is based on the 3D map 94, and the second map property value is derived from a 2D projection 214 of the 3D map 94.

In certain embodiments, the first property value is a surface area of at least a portion of the aligner mold 46. Further, as seen in in FIG. 13, the 3D map 94 is disposed besides a plane 216 (i.e., a spatial boundary 216), with an occlusal side of the teeth portion 96 facing the plane 216. A digital shaping portion 218 representing the shaping portion 208 of the aligner mold 46 is distinguished from a remainder of the 3D map 94 by a digital boundary 220. In this embodiment, the digital boundary 220 is representative of the virtual boundary 92. The method 300 may further comprise the processor 150 sending operating instructions based on the digital boundary 220 to the post-processing device 134 for causing the post-processing device 134 to separate the remainder of material 90 from the aligner 10.

The digital shaping portion 218 represents a portion of the given dental arch 12 on which, according to the given orthodontic treatment plan, the aligner 10 is to be applied. In this embodiment, the first property value is a surface area of the digital shaping portion 218. In certain embodiments, the parsing the 3D map 94 comprises a digital image processing step of distinguishing the digital shaping portion 218 from the remainder of the 3D map 94. This may be performed, for example, by digitally defining the digital boundary 220, or by digitally removing peripheral portions of the 3D map 94 so as to define the digital shaping portion 218.

In certain embodiments, the parsing the 3D map 94 comprises projecting the 3D map 94 onto the plane 216 to generate the 2D projection 214.

Figure 14:
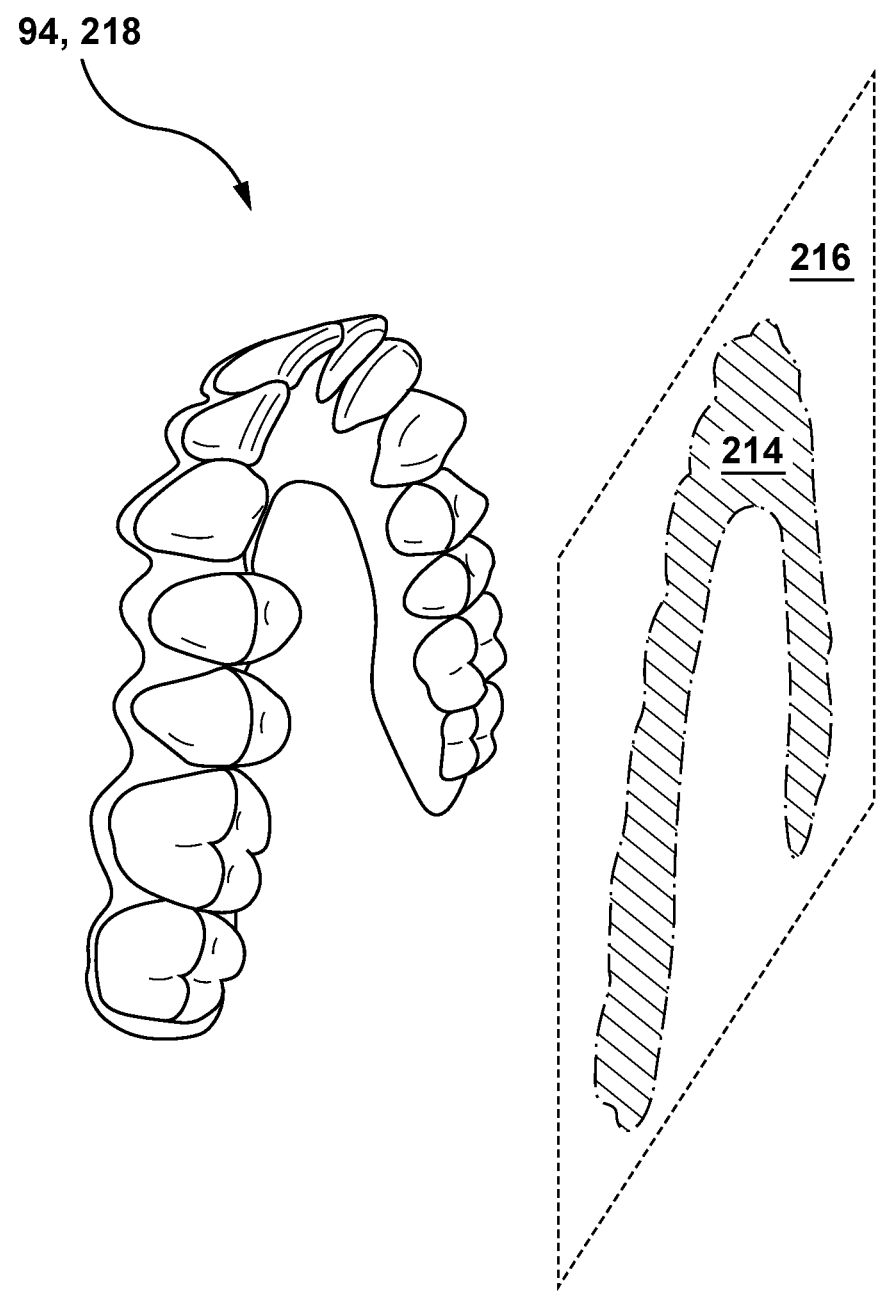
FIG. 14 illustrates a projection of a portion of the digital model of the upper arch of FIG. 13 on the plane of FIG. 13, used during the method of FIG. 10 according to certain embodiments of the present technology.

In certain embodiments, the 2D projection 214 of the 3D map 94 is defined by projecting at least a portion of the 3D map 94 onto the plane 216 (FIG. 14). The second property value is a surface area of the 2D projection 214. In this embodiment, the 2D projection 214 is a projection of the digital shaping portion 218. The plane 216 has a normal orientation being representative of the thermoforming axis 86. It should be noted that the base 70 of the aligner mold 46 is configured with respect to the plane 216 and the digital shaping portion 218 such that disposing the aligner mold 46, via its base 70, on the platform 68 of the thermoforming device 132 orients the shaping portion 208 relative to the thermoforming axis 86 consistently with an orientation of the digital shaping portion 218 relative to the normal orientation of the plane 216.

In Step 322, in certain embodiments, the method 300 further comprises defining the plane 216 for projecting the 3D map 94 (FIG. 12A). For example, the computer system 110 can be arranged to generate the plane 216 based on the teeth portion 96 so as to substantially correspond to an occlusal plane of the given dental arch 12. Alternatively, the computer system 110 can be arranged for the user to input 3D coordinates to define the plane 216.

In certain embodiments, the plane 216 is a virtual plane defined by a vector normal to the virtual plane. In some such embodiments, the surface area of the 2D projection 214 corresponds to an area contained within an outer perimeter of the 3D map 94 defined orthogonally to the vector. In some such embodiments, the outer perimeter of the 3D map 94 is defined by intersecting the 3D map with the plane 216.

Step 330: Determining a Thickness of the Precursor Aligner for Obtaining the Desired Aligner Thickness Based on a Ratio of the First Map Property Value and the Second Map Property Value and a Given Value of an Operating Parameter of the Thermoforming Device As described hereinabove, Developers have discovered that despite variability between archforms in their shape, a thickness of a precursor aligner 44 can be determined, for a given desired aligner 10 thickness and a given value of an operating parameter of the thermoforming device 132, by a pre-determined linear relationship between the given desired aligner 10 thickness and the thickness of the precursor aligner 44. As such, the method 300 continues, in Step 330, with the determining of a thickness of the precursor aligner 44 for obtaining the desired aligner thickness for the aligner 10 derived from the precursor aligner 44.

In certain embodiments, the determining the thickness of the precursor aligner 44 is based on a ratio 222 of the first map property value (in this embodiment, the surface area of the digital shaping portion 218, i.e., $A_1$) and the second map property value (in this embodiment, the surface area of the 2D projection 214, i.e., $A_2$). As shown in Equation 1 and Equation 2 below, the thickness of the precursor aligner 44 (i.e., $H_1$) can be determined by multiplying the desired thickness of the aligner (i.e., $H_2$) by the ratio 222.

$$\frac{A_1}{A_2} = \frac{H_2}{H_1} \qquad \text{Eqn. 1}$$

$$H_1 = H_2 \frac{A_2}{A_1} \qquad \text{Eqn. 2}$$

In certain embodiments, the determining the thickness of the precursor aligner 44 is based on the given value of the operating parameter of the thermoforming device 132. A plurality of ratios 222 may be stored by the computer system 110 for example in a database associating each ratio 222 of the plurality of ratios 222 to a value of the operating parameter of the thermoforming device 132.

Figure 15:
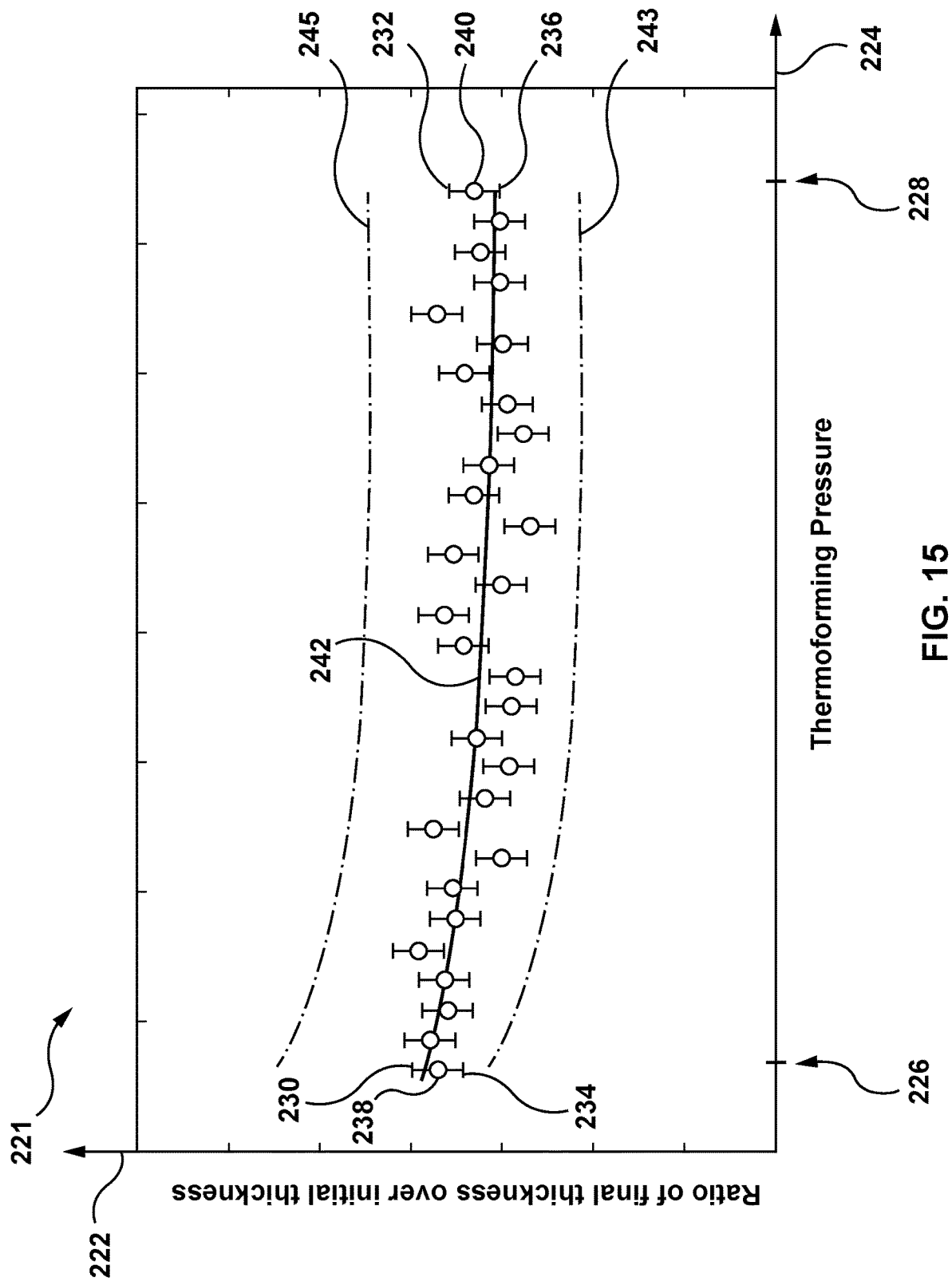
FIG. 15 illustrates a graph of results of controlled experiments involving a thermoforming process according to certain embodiments of the present technology.
Figure 16:
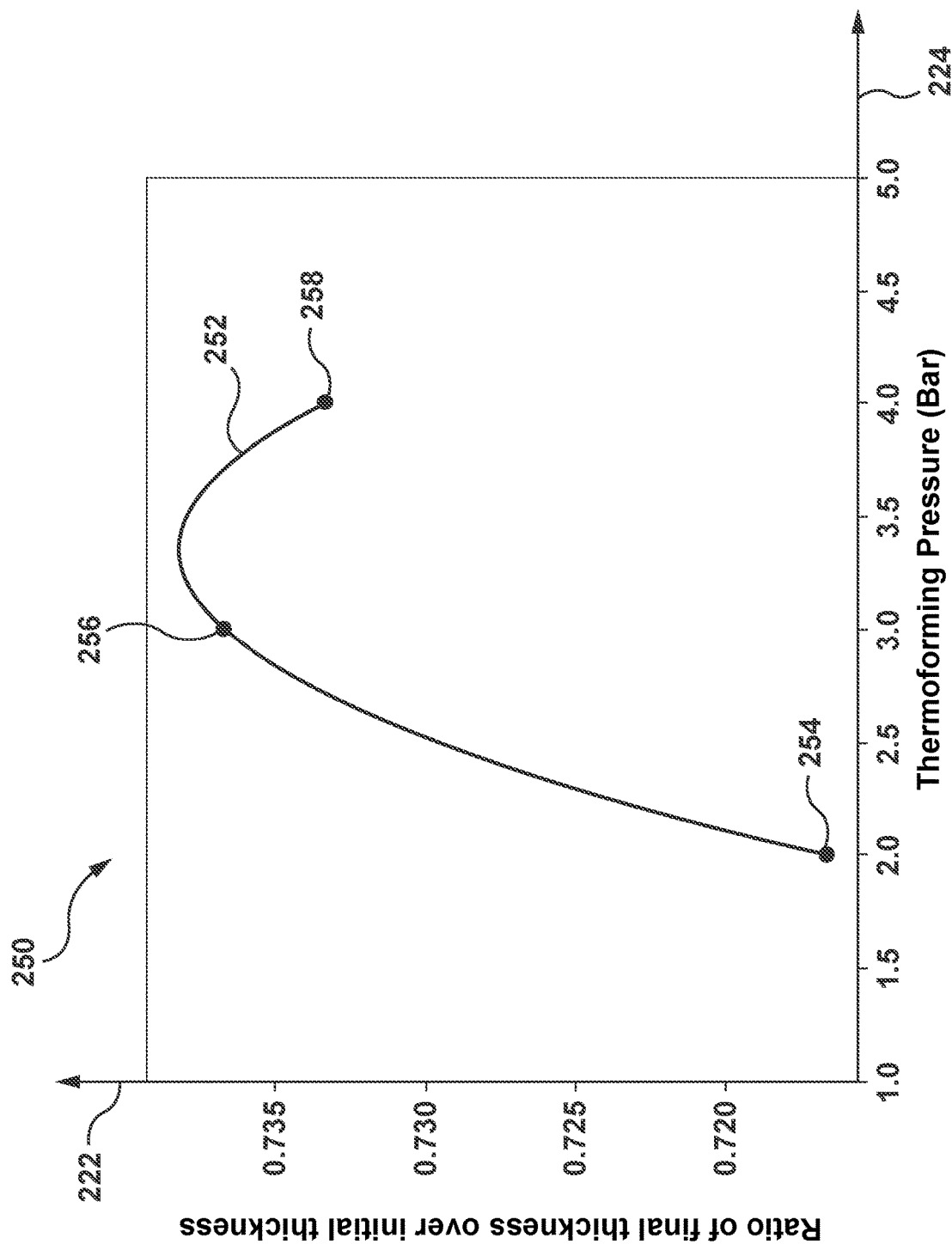
FIG. 16 illustrates a graph of results of a simulated experiment simulating a thermoforming process according to certain embodiments of the present technology.

With reference to FIGS. 15 and 16, in certain embodiments, the given value of the operating parameter of the thermoforming device is relatable to a given ratio 222 as a function of the thermoforming pressure. In some such embodiments, a given function $f(P)$ is obtained either experimentally (e.g., $f_{exp}(P)$) or via a computer implemented simulation (e.g., $f(P)$). The given function $f(P)$ returns the given ratio 222 based on a given thermoforming pressure value (i.e., P), as shown in Equation 3, from which either the thickness of the precursor aligner 44 ($H_1$, Eqn. 4) or the desired thickness of the aligner 10 ($H_2$, Eqn. 5) can be obtained.

$$f(P) = \frac{H_2}{H_1} \cdot \frac{A_2}{A_1} \qquad \text{Eqn. 3}$$

$$H_1 = H_2 \cdot \frac{A_2}{A_1 \cdot f(P)} \qquad \text{Eqn. 4}$$

$$H_2 = H_1 \cdot \frac{A_1}{A_2} \cdot f(P) \qquad \text{Eqn. 5}$$

In certain embodiments, the method 300 provides, in Step 332 predetermining the ratio 222 before the obtaining the 3D map 94 in Step 310. The predetermining the ratio 222 may comprise determining the ratio 222 experimentally. An examples of an experimental determination is set out in Example 1 below, and in FIG. 15, in which the relationship between the thicknesses of the aligner 10 and the pressure of a given thermoforming device 132 is obtained experimentally.

In certain embodiments of the method 300, the determining the thickness of the precursor aligner 44 is based, in part, on results of a simulation of a thermoforming process. An example of such simulation of the thermoforming process is set out in Example 2 below, and in FIG. 16. The simulation is indicative of the thermoforming device 132 being operated with a given thermoforming pressure value 224 for shaping a simulated precursor aligner into a simulated aligner based on a simulated aligner mold. The simulated precursor aligner has a simulated preliminary thickness value, and the simulated aligner has a simulated aligner thickness value. In some such embodiments, the simulation of the thermoforming process is conducted prior to the determining the thickness of the precursor aligner 44, for example via a simulation of the given orthodontic treatment plan. In some such embodiments, the simulation consists in calculating the simulated aligner thickness value based on the given thermoforming pressure value 224 and the simulated preliminary thickness value. The simulated aligner thickness value may then be used as an input to the simulation of the given orthodontic treatment plan. If needed, additional iterations of the simulation of the given orthodontic treatment plan may be performed with other simulated preliminary thickness values until a desirable simulated treatment outcome is obtained.

Figure 17:
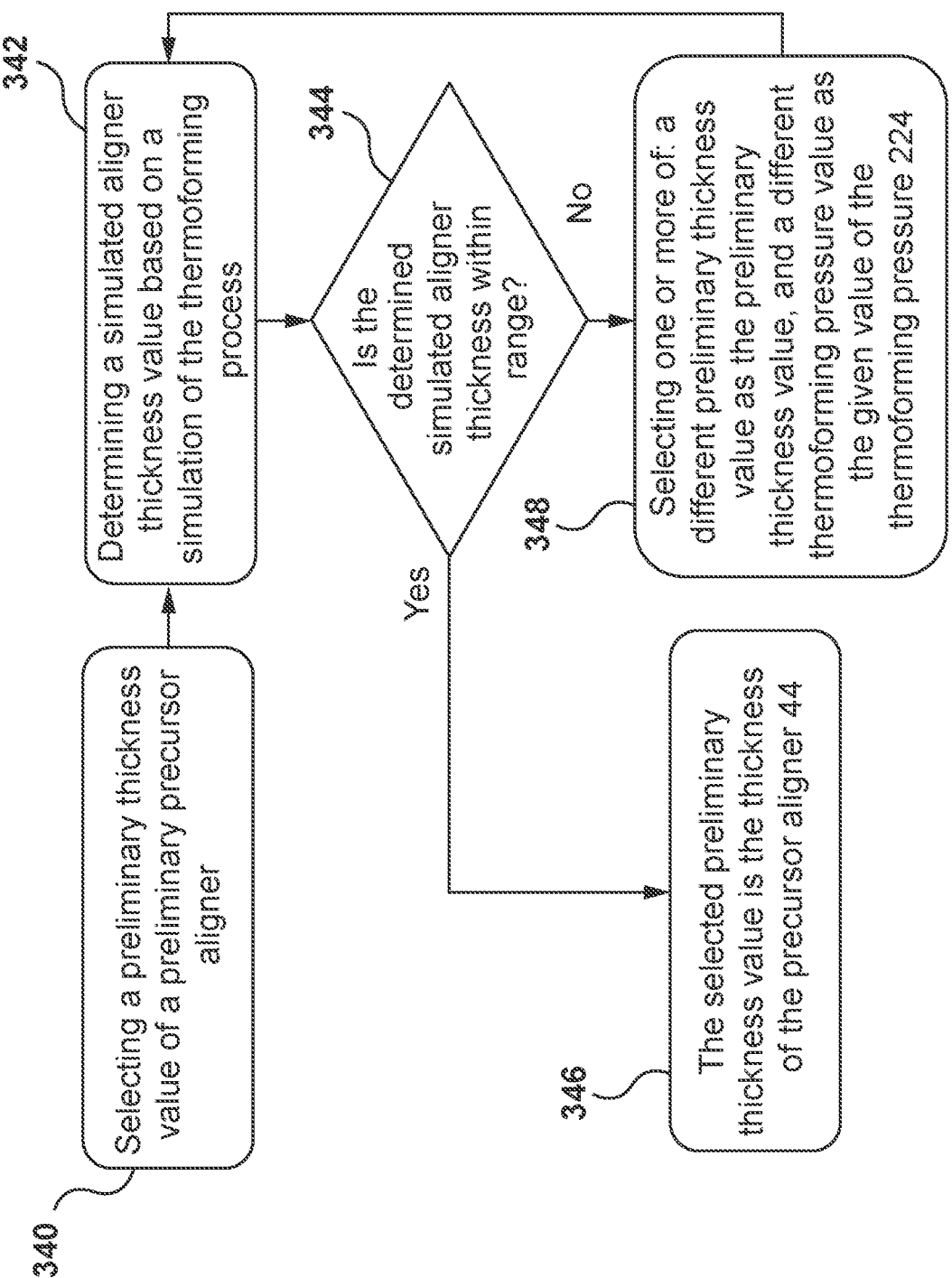
FIG. 17 illustrates method steps for simulation of a thermoforming process according to certain embodiments of the present technology.

Referring to FIG. 17, in certain other embodiments, the simulated preliminary thickness value may alternatively be an output of the simulation of the given orthodontic treatment plan. In some such embodiments, prior to Step 330, a preliminary thickness value of a preliminary precursor aligner is selected (Step 340) as being the simulated preliminary thickness value. Then, the method 300 progresses to determining a simulated aligner thickness value based on the simulation of the thermoforming process (Step 342). In some such embodiments, the simulated aligner thickness value is determined via a determined relationship between aligner thickness and pressure for the given thermoforming device 132 (such as the one shown in Example 1). At Step 344, if the determined simulated aligner thickness value is within a predetermined range of aligner thickness values, the selected preliminary thickness value is the determined thickness of the precursor aligner 44 (Step 346). For example, the range of acceptable values may be a range of acceptable values encompassing the simulated preliminary thickness value and being another output of the simulation of the given orthodontic treatment plan.

If, however, the determined simulated aligner thickness value is outside the predetermined range of aligner thickness values, the method 300 continues with Step 348, iterating through Step 342, until the determined simulated aligner thickness value is within the predetermined range.

In Step 348, at least one simulation parameter value, among the preliminary thickness value and the given value of the thermoforming pressure, is changed before repeating the determining the simulated aligner thickness value in Step 342.

In certain embodiments, the preliminary thickness value can be changed between a low preliminary thickness value and a high preliminary thickness value corresponding, respectively, to a thinnest precursor aligner 44a and a thickest precursor aligner 44b of a predetermined set of precursor aligners 44. The relationship between aligner thickness and pressure may be determined experimentally as described earlier and with reference to Example 1, but using a plurality of the thinnest precursor aligners 44a and a plurality of the thickest precursor aligners 44b, respectively.

In certain embodiments, the given value of the thermoforming pressure can be changed between a low thermoforming pressure value and a high thermoforming pressure value corresponding, respectively, to lower and upper boundaries of a range of predetermined thermoforming pressures of the operating parameter of the thermoforming device 132.

In certain embodiments, the operating parameter of the thermoforming device 132 also comprises a thermoforming temperature. In some such embodiments, in Step 348, a given value of the thermoforming temperature may also be changed before reiterating the determining the simulated aligner thickness value in Step 342.

In certain other embodiments, the method comprises sending instructions to a robotic system, such as the robotic system 138 to select the precursor aligner 44 with the determined thickness from a set of precursor aligners 44 with different thicknesses.

In certain embodiments, the method further comprises causing the selected precursor aligner 44 to be arranged relative to the thermoforming device 132 for shaping the selected precursor aligner 44 into the desired aligner 10.

In some such embodiments, the securing mechanism 88 is controlled to move in the open configuration. The robotic system 138 is controlled to detect the precursor aligner 44 via its vision sensor and to pick the precursor aligner mold 44 via its gripper. The robotic system 138 is then controlled to position the selected precursor aligner 44 via its robotic arm into a position such that the selected precursor aligner 44 is received by the securing mechanism 88 being in the open configuration. Then, the securing mechanism 88 is controlled to move in the closed configuration, securing the selected precursor aligner 44 in place relative to the chamber 64.

In certain embodiments, the method further comprises causing the aligner mold 46 to be arranged relative to the thermoforming device 132 for shaping the selected precursor aligner 44 into the desired aligner 10. In some such embodiments, the robotic system 138 is controlled, for example by the processor of the robotic system 138 or by the processor 150 to detect the aligner mold 46 via its vision sensor and to pick the aligner mold 46 via its gripper. The robotic system 138 is then controlled to position the aligner mold 46 on the platform 68.

In certain embodiments, the method 300 further comprises sending instructions to the thermoforming device 132 to make the desired aligner 10 based on the determined operating parameter. In some such embodiments, the instructions are sent by the processor 150 to the control unit 56 of the thermoforming device 132 to control the heating element 66 and the pneumatic actuator 74.

Identification of equivalent methods and systems are well within the skill of the ordinary practitioner and would require no more than routine experimentation, in light of the teachings of the present disclosure. Practice of the disclosure will be still more fully understood from the following examples, which are presented herein for illustration only and should not be construed as limiting the disclosure in any way.

EXAMPLES

Example 1—Determining the Ratio

In certain embodiments, the operating parameter of the thermoforming device 132 includes a thermoforming pressure. Developers have observed that, in such embodiments, the determining the thickness of the precursor aligner 44 may be based on results of a series of controlled experiments. In one experiment 221 of a series of controlled experiments, a set of the precursor aligners 44 having a same initial thickness, were respectively shaped on a same given aligner mold 46 using different thermoforming pressure values 224 of the thermoforming device 132 to obtain a set of resulting aligners having a final thickness of the aligner body. The ratios 222 were determined by dividing measured values of the final thicknesses by a value of the initial thickness.

A plurality of first precursor aligners 44 were shaped for each of the thermoforming pressure values 224 used in the experiment 221. For each one of the thermoforming pressure values 224, for example a minimum pressure value 226 and a maximum pressure value 228, a plurality of ratios 222 were obtained. For the minimum pressure value 226, a first high ratio 230, a first low ratio 234 and a first mean ratio 238 were obtained. For the maximum pressure value 228, a second high ratio 232, a second low ratio 236 and a second mean ratio 240 were obtained. The results are shown in FIG. 15.

An equation for determining the ratios 222 as an experimentally-derived function 242 (i.e., $f_{exp}(P)$ 242) of the thermoforming pressure values 224 was derived from resulting ratios 222 of the experiment 221, for example using a curve-fitting algorithm executed by the processor 150.

Additional controlled experiments have been performed by Developers using additional sets of precursor aligners 44 respectively having precursor aligner thicknesses being different than the above initial thickness. As described above, additional experimentally-derived functions 243, 245 (i.e., $f_{exp}(P)$ 243, 245) were derived from the additional resulting ratios 222. The functions 243, 245 allow the Developers to relate thermoforming pressure values 224 to additional final thickness values based on corresponding additional initial thickness values.

Example 2—Determining the Ratio

In a simulated experiment being a simulation 250 of the thermoforming process implemented on the processor 150, ratios 222 representing variation in the thickness of precursor aligners 44 resulting from thermoforming operations performed with various thermoforming pressure values were determined and are illustrated in FIG. 16. A simulation-derived function 252 (i.e., $f_{sim}(P)$, represented by Eqn 6 below) was derived from data points 254, 256, 258 representing the determined ratios and their corresponding thermoforming pressure values.

$$f_{sim}(P) = -0.01167*P^2 + 0.07833*P + 0.6067 \qquad \text{Eqn. 6}$$

It will be appreciated that thermoforming pressure values 224, initial precursor aligner thickness values and final thickness values can be related to one another via Equations 5 and 6, for example to simulate the thermoforming process.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a manufacturing parameter for making a desired aligner with a desired aligner thickness using a thermoforming device, the thermoforming device being operable for making the desired aligner by shaping a precursor aligner into the desired aligner using a given mold representative of a given dental archform, the method being implemented by a processor of a computer system connectable to the thermoforming device, the method comprising:
    obtaining a 3D map associated with the given dental archform;
    parsing the 3D map to determine a first map property value and a second map property value, the first map property value being based on the 3D map and the second map property value being derived from a 2D projection of the 3D map,
    determining a thickness of the precursor aligner for obtaining the desired aligner thickness based on a ratio of the first map property value and the second map property value and a given value of an operating parameter of the thermoforming device;
    sending instructions to a robotic system to select the precursor aligner with the determined thickness from a set of precursor aligners with different thicknesses; and
    causing the selected precursor aligner to be arranged relative to the thermoforming device for shaping the selected precursor aligner into the desired aligner.

2. The method of claim 1, wherein:
    the 3D map is representative of the given mold;
    the first map property is a surface area of the given mold; and
    the second map property is a surface area of the 2D projection of the 3D map.

3. The method of claim 1, wherein the operating parameter of the thermoforming device includes the thermoforming pressure, and the determining the thickness of the precursor aligner comprises:
    selecting a preliminary thickness value of a preliminary precursor aligner,
    determining a simulated aligner thickness value based on a simulation of the thermoforming process with the selected preliminary thickness value and the given value of the thermoforming pressure, and selectively executing:
    in response to the determined simulated aligner thickness value being within a predetermined range of aligner thickness values, determining the selected preliminary thickness value to be the thickness of the precursor aligner; and
    in response to the determined simulated aligner thickness value being outside of the predetermined range of aligner thickness values, iteratively:
        selecting one or more of: a different preliminary thickness value as the preliminary thickness value, and a different thermoforming pressure value as the given value of the thermoforming pressure; and
        simulating the thermoforming process with the one or more selected different preliminary thickness value and the different thermoforming pressure value to determine the simulated aligner thickness, until it is determined that the determined simulated aligner thickness value is within the predetermined range of aligner thickness values encompassing the desired thickness of the desired aligner.

4. The method of claim 3, wherein in response to the determined simulated aligner thickness value being less than the predetermined range of aligner thickness values, the selecting one or more of: a different preliminary thickness value as the preliminary thickness value, and a different thermoforming pressure value as the given thermoforming pressure, comprises:
    selecting one or more of a greater thickness value among a plurality of predetermined thickness values as the preliminary thickness value, and selecting a lesser thermoforming pressure value as the given value of the thermoforming pressure.

5. The method of claim 3, wherein in response to the determined simulated aligner thickness value being greater than the predetermined range of aligner thickness values, the selecting one or more of: a different preliminary thickness value as the preliminary thickness value, and a different thermoforming pressure value as the given value of thermoforming pressure, comprises:
    selecting one or more of a lesser thickness value among the plurality of predetermined thickness values as the preliminary thickness value, and selecting a greater thermoforming pressure value as the given value of the thermoforming pressure.

6. The method of claim 3, further comprising generating a preliminary thickness value prior to the obtaining the 3D map.

7. The method of claim 1, further comprising defining a plane for projecting the 3D map, the parsing the 3D map comprising projecting the 3D map on the plane for generating the 2D projection.

8. The method of claim 1, further comprising predetermining the ratio of the first map property value and the second map property value before the obtaining the 3D map.

9. The method of claim 1, further comprising, for the thermoforming device, determining a relationship between thermoforming pressure and the ratio.

10. The method of claim 1, wherein the 3D map is representative of the given mold, the method further comprising determining the 3D map of the mold, the determining the 3D map of the mold comprising obtaining a digital image of the mold.

11. The method of claim 1, wherein the operating parameter comprises thermoforming temperature, the method further comprising:
    determining the desired thickness of the aligner based on at least one of:
        a property of a thermoformable material of the precursor aligner, the property of the thermoformable material relating to a given temperature value of the thermoformable material, and
        a desired orthodontic treatment for the dental archform.

12. The method of claim 11, further comprising determining at least a portion of the desired orthodontic treatment, the orthodontic treatment including a plurality of molds indicative of a plurality of desired shapes of the patient's dental archform at a plurality of points in time, the plurality of molds including the given mold, the determining the at least a portion of the desired orthodontic treatment comprising generating the given mold or a digital model of the mold.

13. The method of claim 1, further comprising: sending instructions to the thermoforming device to make the desired aligner based on the determined operating parameter.

14. A system for determining a manufacturing parameter for making a desired aligner with a desired aligner thickness for a given dental archform, the system comprising:
   a computer system having a processor connectable to a thermoforming device arranged to shape a precursor aligner with a given mold to make the desired aligner, the processor arranged to execute a method comprising:
   obtaining a 3D map associated with the given dental archform;
   parsing the 3D map to determine a first map property value and a second map property value, the first map property value being based on the 3D map and the second map property value being derived from a 2D projection of the 3D map;
   determining a thickness of the precursor aligner for obtaining the desired aligner thickness based on a ratio of the first map property value and the second map property value and a given value of an operating parameter of the thermoforming device;
   sending instructions to a robotic system to select the precursor aligner with the determined thickness from a set of precursor aligners with different thicknesses; and
   causing the selected precursor aligner to be arranged relative to the thermoforming device for shaping the selected precursor aligner into the desired aligner.

15. The system of claim 14, further comprising a set of precursor aligners each having one of a plurality of precursor aligner thickness values, the set of precursor aligners including the precursor aligner with the determined thickness,
   the processor being arranged to determine the precursor aligner thickness value from the plurality of precursor aligner thickness values.

16. The system of claim 15, further comprising a robotic system connected to the processor of the computer system, the robotic system arranged to:
   select the precursor aligner with the determined thickness from the set of precursor aligners; and
   cause the selected precursor aligner to be arranged relative to the thermoforming device for shaping the selected precursor aligner into the desired aligner.

17. The system of claim 16, wherein the robotic system is further operable to:
   select the given mold among a plurality of molds; and
   cause the given mold to be in the operative relationship with the thermoforming device.

18. The system of claim 14, further comprising an imaging device in communication with the processor of the computer system for obtaining a digital image of the mold for determining the 3D map associated with the given dental archform.

* * * * *